United States Patent [19]
Van de Geijn et al.

[11] Patent Number: 5,490,827
[45] Date of Patent: Feb. 13, 1996

[54] TAMPER EVIDENT CONTAINER AND RELATED APPARATUS

[75] Inventors: Peter T. Van de Geijn, Westminster, Md.; Kenneth H. Bealer, York, Pa.; Edward M. Earnest, Owings Mills, Md.; Kenneth H. Kuykendall, Sr., Westminster, Md.; Larry S. Maccherone, Severna Park, Md.

[73] Assignee: Sweetheart Cup Company, Inc., Owings Mills, Md.

[21] Appl. No.: 140,830

[22] Filed: Oct. 25, 1993

Related U.S. Application Data

[63] Continuation-in-part of Ser. No. 26,202, Feb. 26, 1993, Pat. No. 5,253,772, which is a continuation of Ser. No. 876,907, Apr. 30, 1992, abandoned, which is a continuation of Ser. No. 703,858, May 21, 1991, abandoned.

[51] Int. Cl.⁶ ..................................................... B31B 1/90
[52] U.S. Cl. .......................... 493/109; 493/104; 493/158; 493/459; 493/930
[58] Field of Search .................... 493/102, 104, 493/105, 106, 107, 108, 109, 157, 158, 459, 962, 930

[56] References Cited

U.S. PATENT DOCUMENTS

| | | | |
|---|---|---|---|
| 1,436,457 | 11/1922 | Moore . | |
| 1,557,653 | 10/1925 | Carvalho . | |
| 1,955,865 | 4/1934 | Wellman . | |
| 1,961,535 | 6/1934 | Taylor . | |
| 2,002,564 | 5/1935 | Bergman . | |
| 2,041,537 | 5/1936 | Frost . | |
| 2,073,537 | 3/1937 | La Bombard . | |
| 2,383,760 | 8/1945 | Barbieri . | |
| 2,493,086 | 1/1950 | Reifsnyder . | |
| 2,800,266 | 7/1957 | Kelly . | |
| 2,916,861 | 12/1959 | Lehmann | 493/109 |
| 2,941,660 | 6/1960 | Tupper . | |

(List continued on next page.)

FOREIGN PATENT DOCUMENTS

| | | |
|---|---|---|
| 699684 | 12/1964 | Canada . |
| 0098576 | 1/1984 | European Pat. Off. . |
| 0261645 | 3/1988 | European Pat. Off. . |
| 846072 | 9/1939 | France . |
| 876671 | 11/1942 | France . |
| 96848 | 9/1939 | Sweden . |
| 368532 | 3/1932 | United Kingdom . |
| 1172168 | 11/1969 | United Kingdom . |

*Primary Examiner*—Bruce M. Kisliuk
*Assistant Examiner*—Eileen P. Morgan
*Attorney, Agent, or Firm*—Nixon & Vanderhye

[57] ABSTRACT

A tamper evident container assembly includes a container body having a bottom wall and peripheral side wall, the side wall terminating in an outwardly curled rim. A reusable lid includes a top wall portion and a depending skirt portion, the depending skirt portion constructed of spiral wound stock and having a free end, a major peripheral portion of the free-end rocked under the upper rim and upwardly into engagement with the side wall, with a minor peripheral portion of the free end left untucked to thereby provide a gripping area to facilitate tearing and removal of the tear strip. The depending skirt portion is further provided in a lower portion thereof with a line of weakening extending annularly about the skirt portion to thereby define an annular removable tear strip inclusive of the free end, with the line of weakening lying on the rim, between upper and lower edges of the rim. Apparatus for forming the assembly includes a device for pressing a lower portion of the depending skirt portion of the lid under and into engagement with the rim of the container to form a curl about a major peripheral portion of the lid while leaving a minor peripheral portion uncurled while simultaneously forming a vertical slit in the lower portion of the depending skirt portion at an interface between the curled and uncurled portions to thereby simultaneously form a grip tab. Another device is provided for orienting the container to a predetermined rotational position prior to securing the lid. A related method of securing the lid to the container is also disclosed.

12 Claims, 19 Drawing Sheets

U.S. PATENT DOCUMENTS

| | | |
|---|---|---|
| 3,044,610 | 7/1962 | Tupper . |
| 3,058,578 | 10/1962 | Struble . |
| 3,115,292 | 12/1963 | Repking . |
| 3,122,990 | 3/1964 | Fried . |
| 3,126,798 | 3/1964 | Fairchild . |
| 3,142,433 | 7/1964 | Balocca . |
| 3,155,233 | 11/1964 | Tupper . |
| 3,163,973 | 1/1965 | St. Clair . |
| 3,189,214 | 6/1965 | Henchert . |
| 3,197,107 | 7/1965 | Saunders . |
| 3,208,626 | 9/1965 | Miller et al. . |
| 3,317,068 | 5/1967 | Betner . |
| 3,330,436 | 7/1967 | Slomski . |
| 3,344,912 | 10/1967 | Sternau . |
| 3,347,407 | 10/1967 | Coolidge et al. . |
| 3,348,358 | 10/1967 | Sternau . |
| 3,402,874 | 9/1968 | Sternau . |
| 3,414,183 | 12/1968 | Wilcox . |
| 3,416,697 | 12/1968 | Ledzion . |
| 3,465,910 | 9/1969 | Richie . |
| 3,469,727 | 9/1969 | Acton . |
| 3,557,998 | 1/1971 | Collie . |
| 3,572,579 | 3/1971 | Mueller .................. 493/108 |
| 3,589,551 | 6/1971 | Haggbom . |
| 3,597,896 | 8/1971 | Koll et al. . |
| 3,653,529 | 4/1972 | Segmuller ................. 215/42 |
| 3,668,981 | 6/1972 | Turpin et al. . |
| 3,673,761 | 7/1972 | Leitz . |
| 3,773,207 | 11/1973 | Dokoupil et al. .............. 220/27 |
| 3,812,993 | 5/1974 | Yoshioka et al. ............. 215/256 |
| 3,831,798 | 8/1974 | Rowe et al. ............... 215/256 |
| 3,865,268 | 2/1975 | Coop ..................... 215/253 |
| 3,979,003 | 9/1976 | Allen . |
| 3,997,056 | 12/1976 | Mueller . |
| 4,032,029 | 6/1977 | Cochrane . |
| 4,103,803 | 8/1978 | Irvine . |
| 4,105,133 | 8/1978 | La Barge et al. . |
| 4,141,463 | 2/1979 | Smith . |
| 4,208,954 | 6/1980 | Chase . |
| 4,222,974 | 9/1980 | Smith . |
| 4,228,909 | 10/1980 | Lecinski, Jr. . |
| 4,238,047 | 12/1980 | Helms et al. . |
| 4,305,517 | 12/1981 | Dennis . |
| 4,375,969 | 3/1983 | Woerz ..................... 493/108 |
| 4,394,918 | 7/1983 | Grussen . |
| 4,442,971 | 4/1984 | Helms . |
| 4,458,821 | 7/1984 | Ostrowsky . |
| 4,458,822 | 7/1984 | Ostrowsky . |
| 4,470,513 | 9/1984 | Ostrowsky . |
| 4,476,993 | 10/1984 | Krout . |
| 4,478,343 | 10/1984 | Ostrowsky . |
| 4,487,329 | 12/1984 | Winstead . |
| 4,493,432 | 1/1985 | Smith . |
| 4,531,669 | 7/1985 | Osborne . |
| 4,602,718 | 7/1986 | Dutt . |
| 4,607,759 | 8/1986 | Boetzkes . |
| 4,682,706 | 7/1987 | DeVore et al. . |
| 4,782,968 | 11/1988 | Hayes . |
| 4,798,301 | 1/1989 | Bullock et al. . |
| 4,803,829 | 2/1989 | Schneidegger . |
| 4,881,656 | 11/1989 | Chumley et al. . |
| 4,893,452 | 1/1990 | Bruce et al. . |
| 4,966,294 | 10/1990 | Mack et al. ............... 220/266 |
| 5,002,198 | 3/1991 | Smith . |

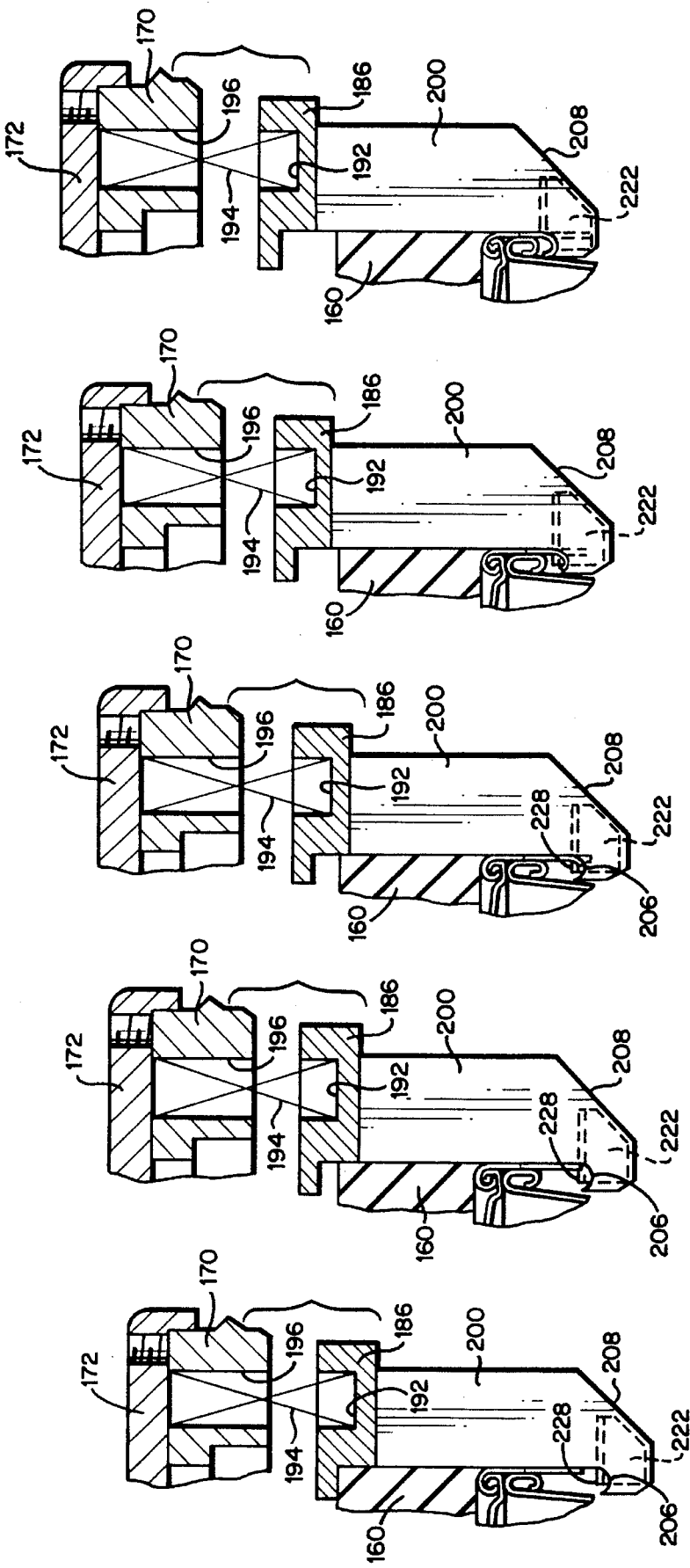

Fig. 20
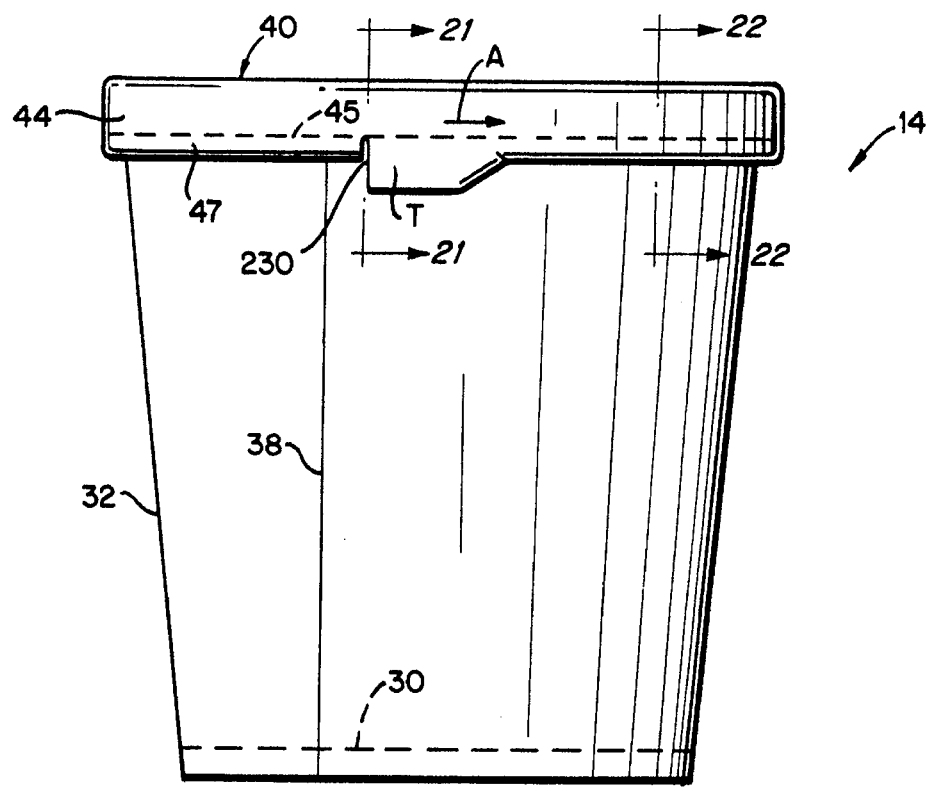
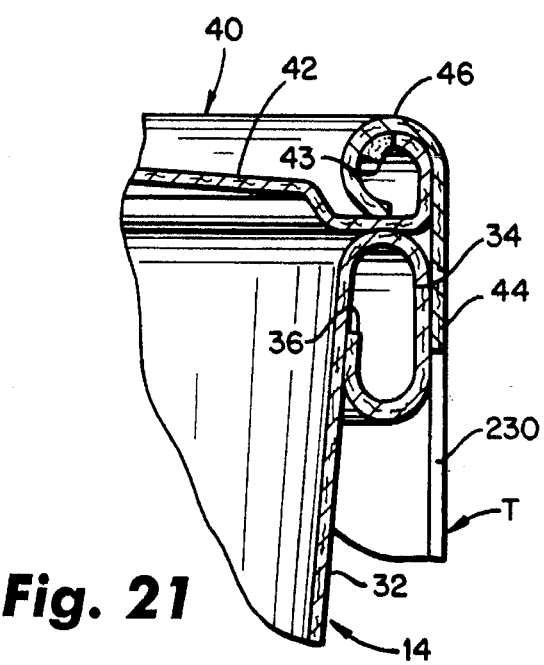
Fig. 21
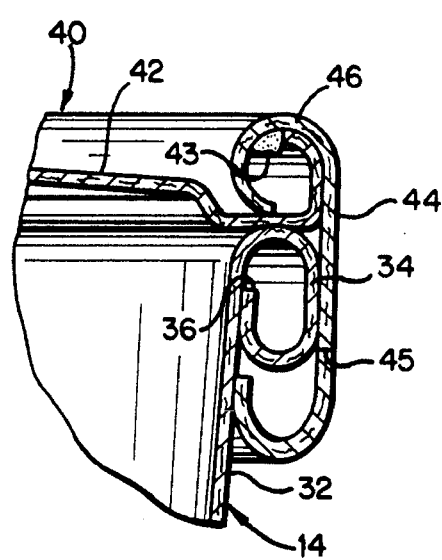
Fig. 22

TAMPER EVIDENT CONTAINER AND RELATED APPARATUS

This application is a continuation-in-part of application Ser. No. 08/026,202 filed Feb. 26, 1993, now U.S. Pat. No. 5,253,772, which is a continuation of Ser. No. 07/876,907 filed Apr. 30, 1992, now abandoned, which in turn is a continuation of Ser. No. 07/703,858 filed May 21, 1991, now abandoned.

BACKGROUND AND SUMMARY OF THE INVENTION

This invention relates to improved tamper evident container constructions including apparatus for forming such containers.

It has become increasingly important to provide tamper proof or tamper evident packaging for consumer related goods and particularly for medicinal products and foodstuffs. Recent history documents the tragic consequences which can occur when tampering with container contents goes unnoticed. It is, in fact, now required by law that at least certain pharmaceutical products be protected by in tamper proof packaging. The practical necessity for tamper proof or tamper evident packaging for non-medicinal products and particularly for packaged food items such as ice cream and other dairy products, as well as many other pre-prepared food products is readily apparent.

Numerous attempts have been made in the container industry and specifically with respect to consumer oriented foodstuffs, medicines, etc. to prevent potentially harmful tampering with the contents of such containers. It is well known, for example, to heat seal a thin foil disk about the container opening prior to application of the lid. This approach, while successful to a large extent, nevertheless involves the addition of another component to the assembly, i.e., the foil disk, and related assembly procedures and associated costs.

Other attempts to provide effective tamper proof mechanisms in container assemblies are well documented in the patent literature. U.S. Pat. No. 4,966,294, for example, discloses a tamper evident closure for a wide mouth container wherein rim segments are formed in the skirt portion of the container lid and are arranged so that upward lifting force applied against the lid flange will cause breakage to occur at opposite ends of the flange, and a continued upward pulling on the flange will results in a pair of tear lines in the lid to facilitate removal of the lid.

In U.S. Pat. No. 2,383,760, a closure for a container includes a flat upper surface in the peripheral depending skirt portion, around which is adhesively secured a strip which extends below the container flange and includes a bent marginal flange portion extending upwardly and inwardly from the bend. The flange is a continuous, smooth flange which, after insertion over the upper portion of the container, will snap into locking engagement with the flange. The marginal portion of the sealing strip is provided with a strip of adhesive so that the marginal portion will be cemented to the inside face of the container flange. No means are provided, however, for facilitating the easy removal of the closure. In fact, it is stated that when a container is opened, the cover will be disposed of, apparently because it will be damaged or destroyed in the opening operation.

In U.S. Pat. No. 1,955,865, container closures are disclosed which are formed with depending skirt portions and integral circumferentially spaced bent tab portions. These tab portions are designed to cooperate with complementary circumferentially spaced tabs formed on the periphery of the container side wall. Locking of the lid to the container is achieved by pressing the closure down over the tabs and rotating it so that the tabs will lie behind respective tabs on the container side wall. Fairly rigid disks are required to maintain the locking engagement between the cover and the container.

Other tamper proof constructions are disclosed in U.S. Pat. Nos. 3,044,610; 3,997,056 and 4,602,718.

These prior efforts are characterized by rather complex, and therefore costly, arrangements which are not fully satisfactory in all respects.

This invention provides a reliable and reusable tamper evident container construction particularly useful in the packaging of ice cream and other food products, as well as apparatus for forming such containers. The tamper evident lid in accordance with this invention is an improvement over the tamper evident lid disclosed in the above identified commonly owned '907 application.

In the latter application, the tamper evident lid comprises a paper or paperboard center disk which is roll seamed to a peripheral depending skirt. The depending skirt is formed from spiral wound paper stock and includes a line of perforations about the periphery of the skirt, overlying the container rim, to define a removable tear strip. After the container is filled and lidded, the lower end of the peripheral skirt is curled radially inwardly under the container rim to thereby lock the lid in place. A tear or gripping tab provided in the tear strip allows the user to separate the tear strip from the lid thereby enabling the lid to be removed from the container. At the same time, once the tear strip has been removed, the fact of its removal is readily apparent from visual inspection, so that any tampering with the container contents via removal and subsequent replacement of the lid is immediately evident.

In this continuation-in-part application, the peripheral skirt of the lid is formed of at least two and preferably three layers of spiral wound paper stock and a fourth outer printing layer (i.e., a relatively thin paper layer). This construction has been found necessary in order to provide the required column strength for the peripheral skirt during the curling operation. In this improved version of the lid, the three layers of spiral wound stock are arranged so that the spiral seams are staggered, one relative to the other. As a result of this three-ply (four layer) construction, the necessary strength is achieved while permitting greater tolerance in the spiral seam gaps of the respective spiral wound stock layers.

This continuation-in-part application also relates to apparatus which may be employed to secure the tamper evident lid on an associated, filled container in such a way that the locking curl and the gripping tab are formed simultaneously. In a first exemplary embodiment of the apparatus, a conventional Flex-E-Fill® container filing machine including a turntable which indexes individual containers, one at a time through a filling and lidding station, has been modified to incorporate a new die press head for securing the tamper evident lid of this invention to a filled container while simultaneously forming a gripping tab in the removable tear strip portion of the lid.

There is also provided in this first exemplary embodiment, an alignment mechanism which rotates the container to a predetermined orientation so that printed matter relating to the manner in which the tear strip is to be removed will be properly aligned on the container side wall in proximity to the gripping tab on the lid. More specifically, the filled container is initially indexed past an alignment mechanism which includes a rotatable arm which engages the peripheral side wall of the container. This arm is caused to rotate through a full 360°, finding and engaging the container side wall seam during its rotation, and by engaging the seam, causing the container to rotate through the balance of the 360° to thereby locate the seam in a predetermined orientation. After receiving a lid, the container/lid assembly is thereafter indexed to the lid die press station where each container is raised up into the die head. Split, segmented dies are then closed and pulled upwardly to curl or tuck the depending peripheral skirt portion of the lid around the lower edge of the container rim. The segmented dies form a substantially continuous curling annulus when closed, except for a minor portion of the circumference where the curling surface is omitted so as to leave an untucked or uncurled portion which forms the gripping tab for removing the tear strip. A slitting knife is also provided in this area of the segmented dies to form a vertical slit in the depending skirt where the curled portion interfaces with the uncurled portion. This slit defines an edge of the gripping tab which allows the latter to be easily pulled by the user to remove the tear strip from the lid.

After the lid has been secured to the container as described above, the segmented dies open in a radial direction allowing the container to be lowered back to its original level, and the lidded container is then indexed out of the machine and transferred passed onto a conveyor.

In a second exemplary embodiment of the apparatus, a multi-head machine is provided which receives already filled and lidded containers in a continuous operation, and which automatically secures each container lid to its associated container. In this second exemplary embodiment, a turntable is provided with eight die press heads which are similar in every respect to the die press heads utilized in the earlier described embodiment. In this second exemplary embodiment, however, the speed with which the container lids are secured to their associated containers is greatly increased by reason of the continuous operation of the machine and the use of a plurality of die press heads. This second exemplary embodiment also utilizes an alignment mechanism for rotating the containers to a predetermined orientation in a manner similar to the earlier described embodiment, although utilizing slightly different mechanical components reflecting the continuous nature of the multi-head machine. The alignment mechanisms for both exemplary embodiments will be described in further detail herein.

Accordingly, this invention in its broader aspects relates to a tamper evident lid for use with a container including a container body having a bottom wall and a peripheral side wall, the side wall terminating in an outwardly curled rim, the lid comprising a top wall and a depending skirt having upper and lower ends, the depending skirt secured at the upper end to the top wall, wherein the depending skirt is constructed from at least two layers of spiral wound paper stock, each having a spiral seam offset circumferentially relative to each other.

In another aspect, the invention relates to a tamper evident container assembly comprising a container body having a bottom wall and peripheral side wall, the side wall terminating in an outwardly curled rim; a reusable lid having a top wall portion and a depending skirt portion, the depending skirt portion constructed of spiral wound stock and having a free end, a major peripheral portion of the free end tucked under the upper rim and upwardly into engagement with the side wall, between the side wall and the rim, a minor peripheral portion of the free end is left untucked to thereby provide a gripping area to facilitate tearing and removal of the tear strip, the skirt portion including the tucked portion being in substantially continuous engagement with the rim to thereby lock the lid to the container body; wherein the depending skirt portion is further provided in a lower portion thereof with a line of weakening extending annularly about the skirt portion to thereby define an annular removable tear strip inclusive of the free end, the line of weakening lying on the rim, between upper and lower edges of the rim.

In another aspect, the invention relates to apparatus for securing a tamper evident lid to a container wherein the lid includes a depending skirt portion and the container includes a rim at an upper open end thereof, the apparatus comprising:

a) first means for pressing a lower portion of the depending skirt portion of the lid under and into engagement with the rim of the container to form a curl about a major peripheral portion of the lid while leaving a minor peripheral portion uncurled; and b) second means cooperating with the first means for simultaneously forming a vertical slit in the lower portion of the depending skin portion at an interface between the curled and uncurled portions to thereby form a gripping tab therein.

The above described invention thus provides a novel, tamper evident lid construction and associated apparatus for securing the tamper evident lid to a container in a relatively simple and economical manner to provide a high quality, tamper evident lid/container assembly which safeguards the user against potentially harmful tampering.

Additional objects and advantages of the invention will become apparent from the detailed description which follows.

BRIEF DESCRIPTION OF THE DRAWINGS

FIG. 3A is an enlarged detail, showing the manner of engagement between the alignment mechanism and the container;

FIGS. 12A–12E are partial side sections illustrating, in sequence, the manner in which the die segments secure the lid to the container;

FIG. 20 is a side view of a container in accordance with this invention;

FIG. 21 is a partial section view of the container taken along the line 21—21 in FIG. 20;

FIG. 22 is a partial side section of the container taken along the line 22—22 in FIG. 20;

DETAILED DESCRIPTION OF THE DRAWINGS

Figure 1:
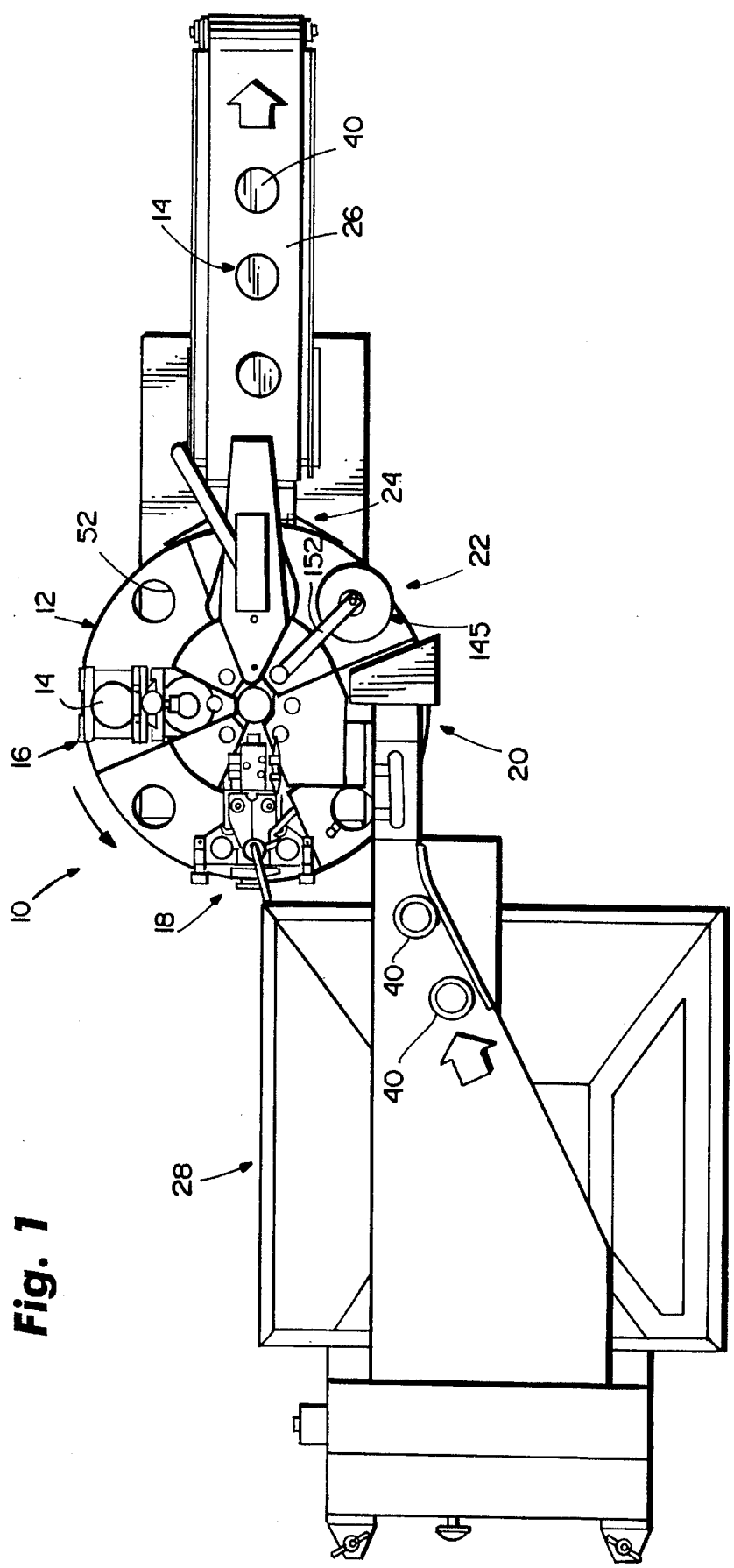
FIG. 1 is a top plan view of a container lidding and filling machine, modified to include the subject matter of this invention.

With reference now to FIG. 1, a conventional "Flex-E-Fill® Machine of the type manufactured by or for Sweetheart Cup Company Inc. is shown at 10. The machine as shown, however, has been modified to incorporate the hardware and features of this invention as described in more detail below. It should be noted here that references to direction of movement of container or tooling components are by way of example only. Depending on specific applications, the directions and/or orientations of the container and/or tooling components may be changed.

The machine 10 includes a turntable 12 which receives open topped containers 14 (see FIG. 2) via a cup dispenser (or other means for loading cups) at a first transfer station 16, and indexes the containers, in succession, to a filling station 18, a lid receiving station 20, a die press station 22 and a second transfer station 24, where filled and lidded containers are transferred individually and sequentially, onto a conveyor 26.

The turntable 12 and its drive/index unit, the filling station 18, the lid applying mechanism at the lid receiving station 20 (and including the lid feed and sort apparatus shown at 28) and the transfer mechanism at the exit station 24 are all conventional and need not be described here in detail. This invention relates to the mechanical units attached to the turntable which are synchronized therewith to perform two additional functions related to the securing of the lids to the filled containers.

Before discussing the machine in detail, however, it may be helpful to discuss the improved container and lid construction in accordance with the invention. Referring especially to FIGS. 20–22, each container 14 includes a bottom disc or wall 30, a tapered or straight peripheral sidewall 32, and an outwardly and tightly turned rim or curl 34 at its upper end terminating at an upwardly turned edge 36. The container is of paperboard (or other suitable paper product) construction, and includes a longitudinal seam 38.

Figure 17:
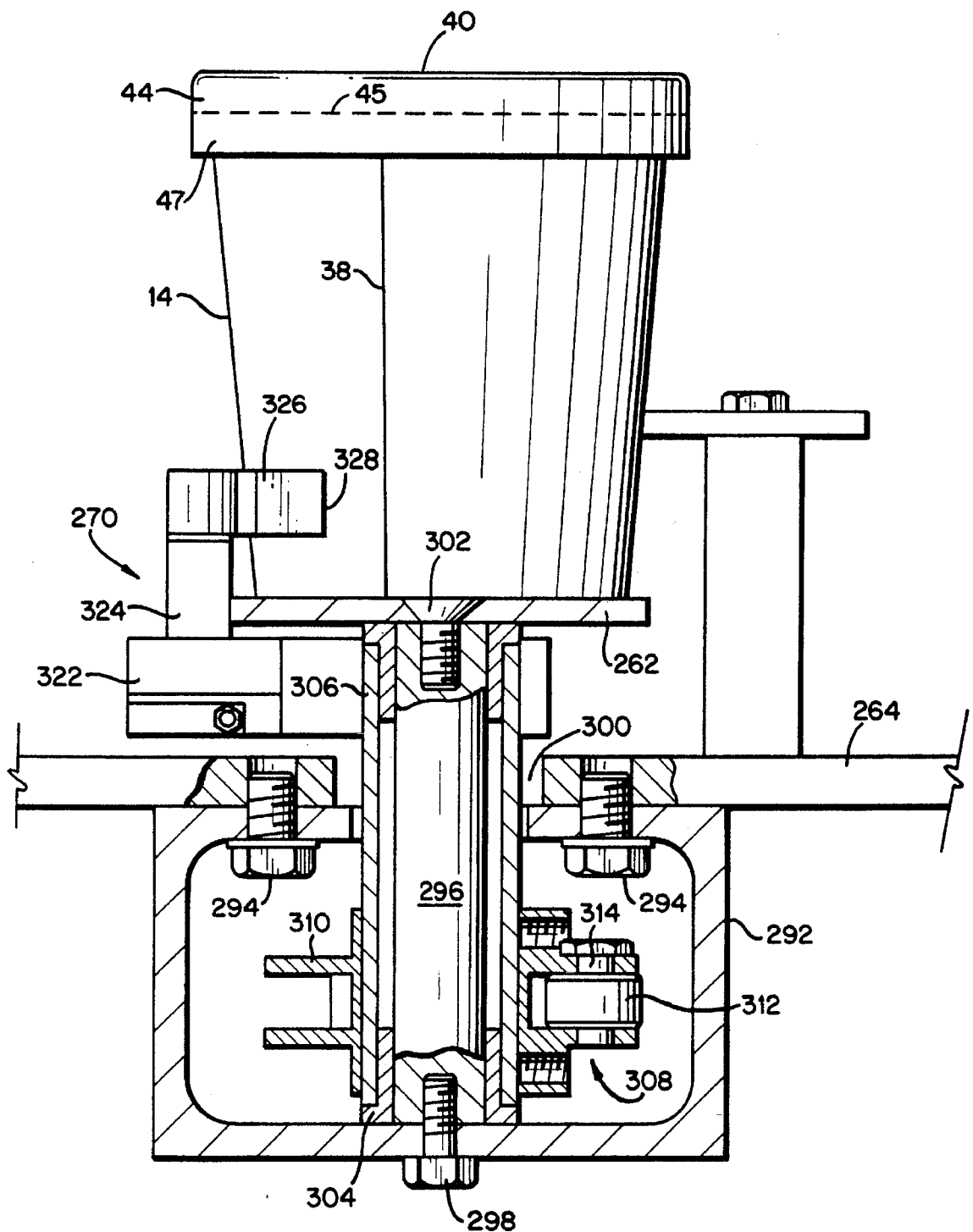
FIG. 17 is a side view partially in section, illustrating the container and alignment mechanism of the type incorporated into the machine shown in FIG. 13.

The container lid 40 includes a center board or disk 42 and a peripheral skirt 44 which extends substantially vertically downwardly from the disk 42. The disk 42 is roll seamed to the skirt 44 with the aid of adhesive 43, thus providing an upstanding curl 46. As initially applied to the container, the unsecured lid 40 appears as shown in FIG. 17, with the depending skirt 44 extending vertically downwardly in a straight, uncurled fashion. Prior to assembly with a container, the skirt 44 is provided with an annular line of weakening in the form of perforations 45 between the upper and lower ends of the skirt which defines a removable tear strip 47. The line of perforations 45 is located within the height dimension of the skirt 44 such that it will lie on the container rim 34, between the upper and lower edges of the latter. As will be explained in greater detail below, by so locating the perforation line, a lower portion of the rim 34 will be exposed and clearly visible upon removal of the tear strip 47.

The container rim 34 is formed with a length or height dimension sized to provide not only a visible exposed portion when the tear strip is removed, but also to allow for a remaining skirt length (after removal of the tear strip) which is sufficient for purposes of re-use of the lid, i.e.; repeated removal and re-application by the consumer until the container is empty.

After curling, the lower portion of the skirt 44 is tucked up under the rim 34 to the position shown in FIG. 22.

As best seen in FIGS. 20 and 21, a portion of the tear strip is left uncurled to provide a tear or gripping tab. The edge 230 of the tab T is defined by a vertical slit which extends from the lower edge of skirt 44 substantially or completely to the line of perforations 45. This allows the tab to be easily gripped for tearing the strip 47 from the lid in the direction of arrow A in FIG. 20.

The skirt portion 44 of the lid is formed of conventional spiral wound stock, but in order to withstand the curling operation and in order to maintain the integrity of the curl, the skirt is formed with at least two and preferably at least three (for larger lids) structural layers of spiral wound stock, with the spiral seams of each layer running in the same general direction, but staggered in the circumferential direction of the lid. In other words, the spiral seams do not overlie one another. An outer layer is typically employed in the form of a thin paper or foil layer suitable for printing. In a typical construction, the two inner stock layers have a thickness of about 0.0095" each, and the outer stock layer has a thickness of about 0.0063". The outer paper layer may have a thickness of about 0.0028", or if comprised of foil, a thickness of about 0.0024". In light of the relative thinness of the layers, the skirt 44 has been illustrated in the drawings as a single composite layer. It will be appreciated, however, that the specific composition of the skin will vary with lid size.

Figure 23:
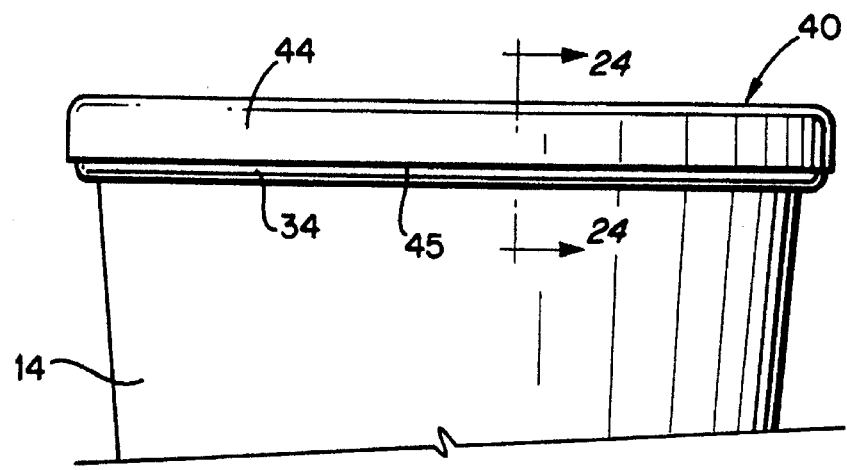
FIG. 23 is a partial side view of a container similar to that shown in FIG. 20, but with the integral tear strip removed.
Figure 24:
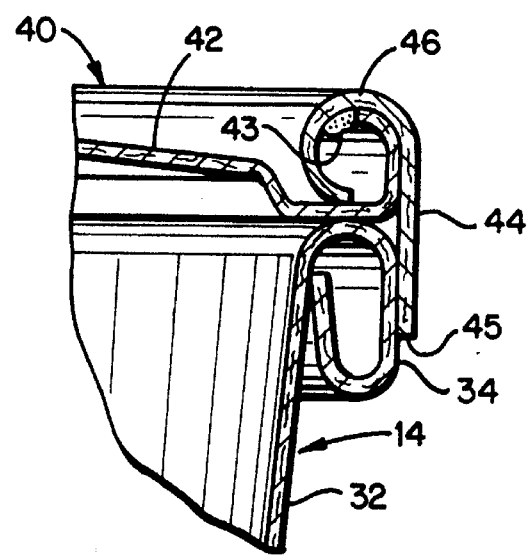
FIG. 24 is a partial side section taken along the line 24—24 of FIG. 23.

In a typical arrangement, the container rim 34 has an axial depth of about 0.210 inch; the distance between the line of perforations 45 and the lower edge of the rim 34 is about 0.050; and the distance between the line of perforations 45 and the upper edge of rim 34 is about 0.160 inch. By this arrangement, the lower portion of the rim 34 is clearly visible when the tear strip 47 is removed (see FIGS. 23 and 24), thus providing certain evidence of tampering. At the same time, there is sufficient depth to the remaining skirt portion as to provide good closure characteristics on re-use of the lid.

With further regard to tamper evidence, the "ragged edge" of the remaining skirt portion, resulting from the tearing through the line of perforations, is also clearly visible against the backdrop of the container rim. The indication of removal of the tear strip may be even further enhanced by the use of contrasting colors for the rim and lid skirt.

Figure 2:
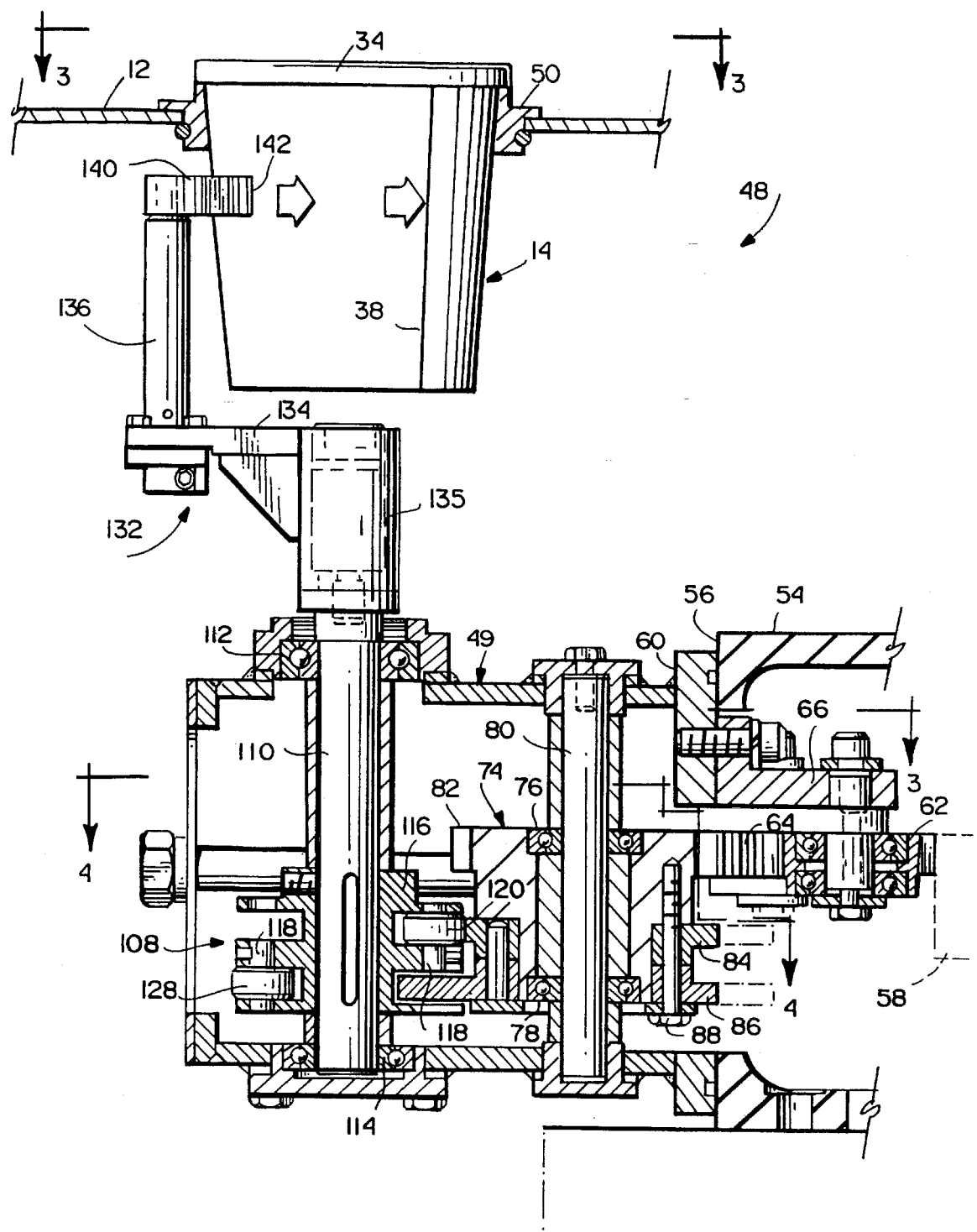
FIG. 2 is a partial side view, partially in section, of the machine illustrated in FIG. 1.

Returning now to FIG. 1, the first of the mechanical devices which forms a part of the apparatus aspect of this invention is shown generally at 48 and includes a mechanism for rotating each container 14, in sequence, to align the vertical container seam 38 at a predetermined rotational position. Referring now to FIG. 2, an unlidded container 14 is shown supported on a support ring 50 mounted in an aperture 52 (see FIG. 1) provided in the turntable 12. More specifically, an upper edge of the support ring 50 is shown in engagement with the underside of the outwardly turned container rim or curl 34, such that substantially all of the container body extends below the turntable 12.

Figure 3:
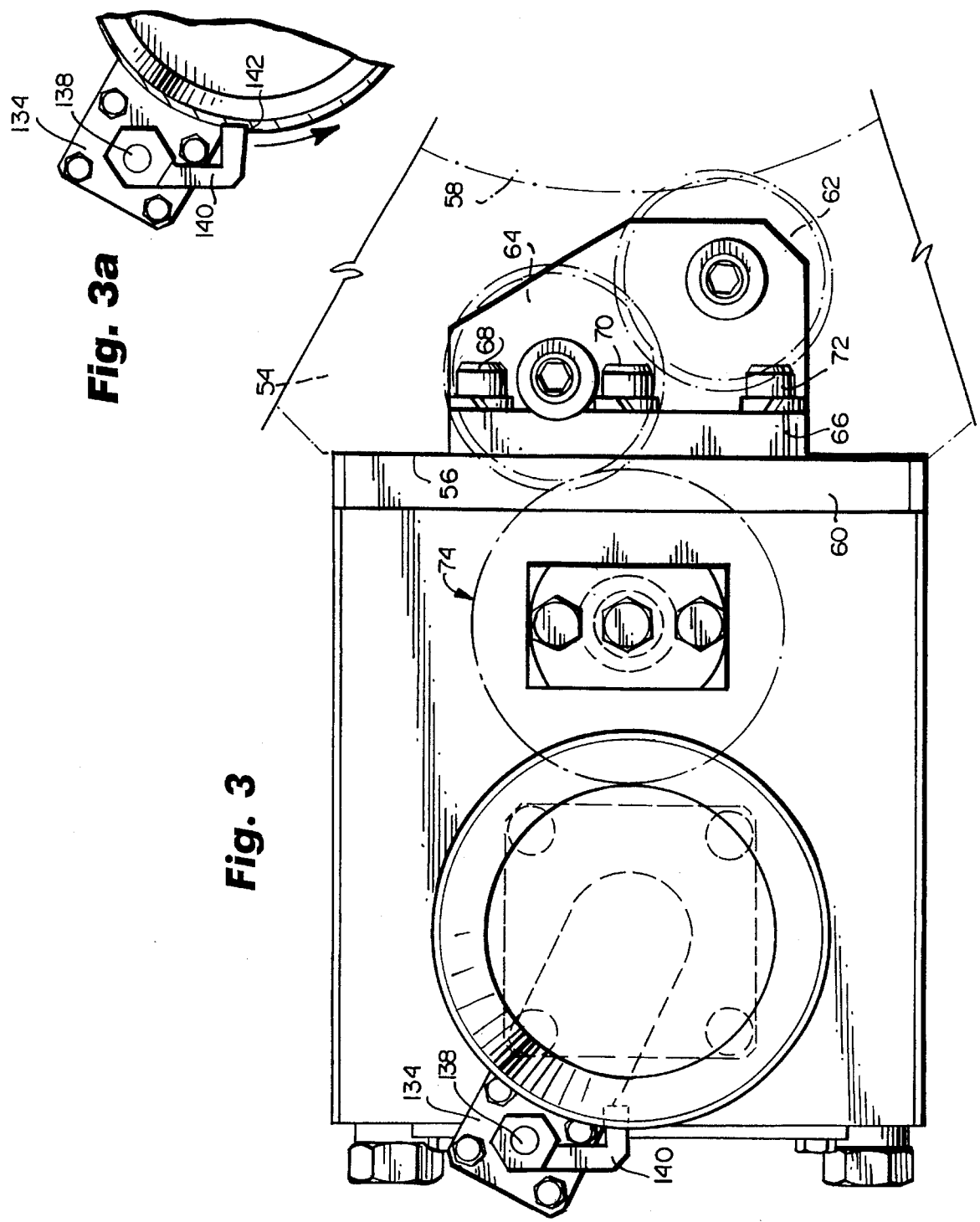
FIG. 3 is a plan view taken along the line 3—3 of FIG. 2.

Below the turntable 12, there is a fixed turntable drive housing 54 which has an octagonal peripheral shape (as shown partially in FIGS. 3 and 4). The flat vertical housing surfaces which define the octagonal shape provide easy access to the turntable drive. For ease of understanding, and with reference again to FIG. 1, each turntable aperture 52 (starting with one at the first receiving station 15) overlie one of the octagonal faces of housing 54, below the turntable 12. The alignment mechanism 48 is connected to a main drive gear (shown in phantom at 58 in FIG. 2) through an opening in one of the the housing faces 56, as described below.

The alignment mechanism 48 includes a housing 49 attached to the main turntable housing 54 at planar octagonal face 56 so as to provide direct access to the drive gear 58. As best seen in FIGS. 2 and 3, an end plate 60 of the alignment mechanism housing 49 mounts a pair of gears 62, 64 by means of a bracket 66 secured to the end plate 60 by means of bolts 68, 70 and 72. The gear 62 meshes with the main turntable gear 58 and with the gear 64, as best seen in FIG. 3. At the same time, gear 64 meshes with a gear/cam assembly 74 mounted for rotation via bearings 76, 78 on a fixed shaft 80 secured within the alignment assembly housing 49 as best seen in FIG. 2. The gear/cam assembly 74 includes gear portion 82 which meshes with the gear 64 and also includes a pair of cam plates 84 and 86, which are fixed relatively to each other and to the gear portion by bolts (one shown at 88). The cam plates 84,86 overlie each other and are located axially below the gear 82. Plates 84, 86 and gear 82 are all mounted concentrically with respect to the shaft 80.

Figure 4:
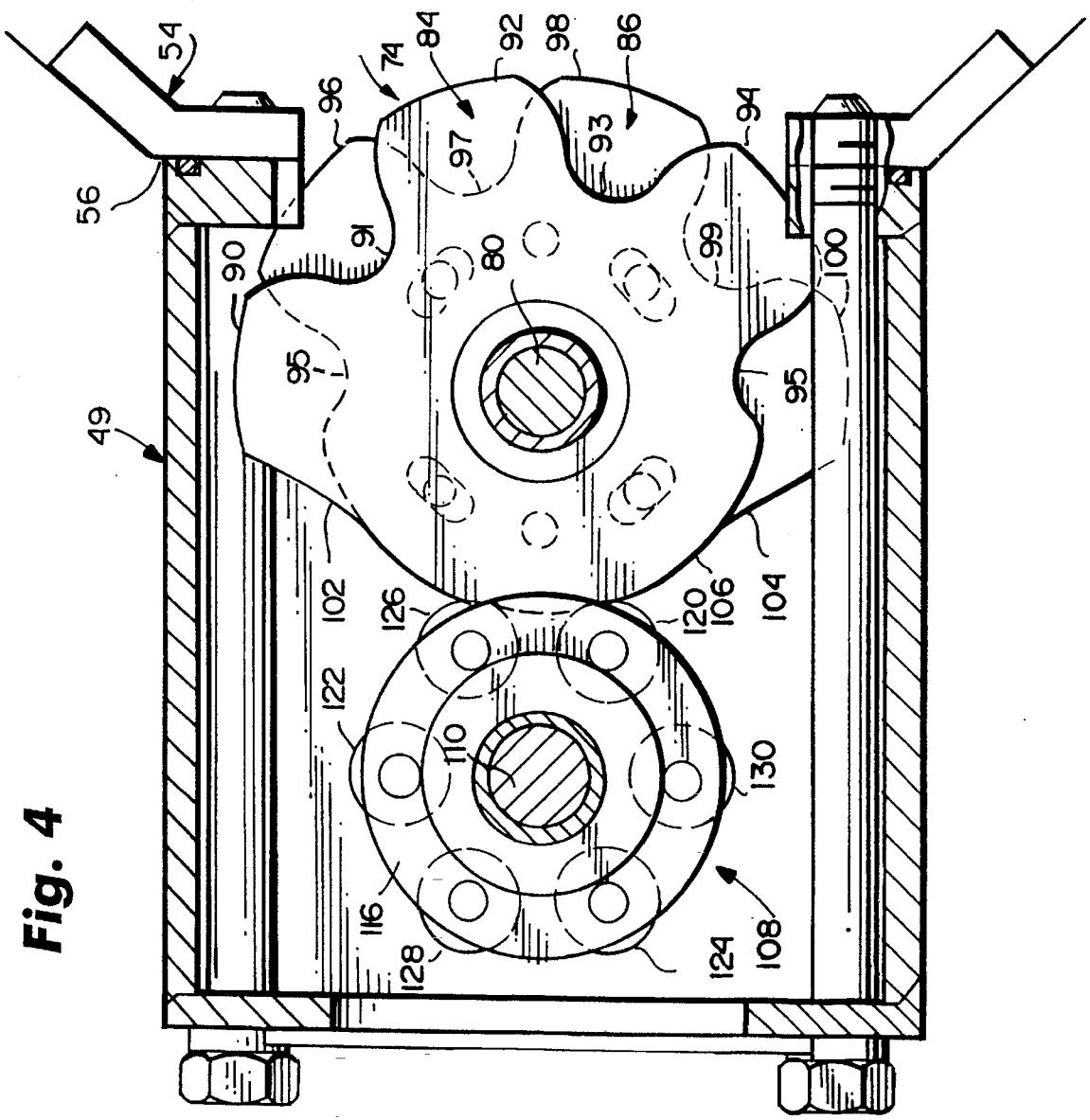
FIG. 4 is a section taken along the line 4—4 in FIG. 2.

With reference particularly to FIG. 4, the cam plate 84 is formed with three cam lobes (similar to gear teeth) having top lands 90, 92, 94, and plate 86 is formed with three similar cam lobes having top lands 96, 98, 100, respectively. Between each lobe or tooth is a root portion or bottom land. Thus, the upper cam plate 84 includes bottom lands 91, 93 and 95, while plate 86 includes bottom lands 95, 97 and 99. The upper cam plate 84 also includes an entrance ramp surface 102, while the lower cam plate 86 includes an exit ramp surface 104. In fact, plates 84 and 86 are exact mirror images of one another, i.e., identical plates with one flipped relative to the other. Between the entrance ramp 102 and exit ramp 104, both plates have a continuous, smooth, arcuate portion 106 which overlie each other. It will be appreciated that the cam plates 84,86 and gear portion 82 are fixed for common rotation relative to the fixed shaft 80.

Adjacent the gear/cam assembly 74, there is a follower assembly 108 which is keyed to a shaft 110 mounted for rotation in the housing 49 by means of bearings 112 and 114. The follower assembly 108 includes a follower cage 116 with six follower or idler wheels mounted for rotation about parallel, vertical axes defined by pins 118. Three of the follower wheels 120, 122 and 124 are located in the upper half of the cage 110, while the remaining follower wheels 126, 128 and 130 are located in the lower half of the cage. This height differential between follower wheel sets corresponds to the height differential between cam plates 84, 86. In other words, three upper follower wheels in a first set lie in a first horizontal plane for meshing engagement with plate 84, while the remaining three lower follower wheels lie in a second horizontal plane for meshing engagement with plate 86. When viewed in plan (FIG. 4), the upper and lower followers alternate with each other about the circumference of the cage, i.e., in the sequence (counterclockwise from the 4 o'clock position) 120, 126, 122, 128, 124 and 130. The interaction between the gear cam assembly 74 and the follower assembly 108 will be described in greater detail below.

Returning to FIG. 2, the shaft 110 extends out of the housing 49 and mounts an indexing arm assembly 132. The latter includes a crank 134 secured to the upper end of the shaft 110 by any suitable means, such as a splined sleeve 135. A vertical sleeve 136 is secured to the radially outer end of the crank 134 and receives an internal shaft or pin 138 (see FIG. 3) which supports an indexing arm 140. The pin 138 and indexing arm 140 are mounted for rotation about the longitudinal axis of the sleeve 136. The arrangement is such that the crank 134, sleeve 136 and arm 140 rotate about the shaft 110, while the indexing arm 140 is itself rotatable about an axis defined by the pin 138. A conventional torsion spring (not shown) is located between the sleeve 136 and shaft 138 to bias the indexing arm in a counterclockwise direction as viewed in FIG. 3a.

The operation of the alignment mechanism 48 is as follows.

After a container 14 is filled with contents (such as ice cream or other foodstuff) at the filling station 18, the filled but unlidded container is indexed toward the lidding station 20. As turntable 12 is driven in a counterclockwise direction, the smooth portions 106 of plates 84, 86 are engaged by upper and lower follower wheels of the follower assembly 108 during travel of the container between the lower filling mechanism 18a (as viewed in FIG. 1) and the alignment mechanism 48. When the container side wall is engaged by the indexing arm 140, the arm 140 is rotated slightly in the clockwise direction (as viewed in FIG. 1) about the pin 138 against the bias of the internal torsion spring in the sleeve 136 to insure that the arm will be biased against the container side wall.

As shown in FIG. 4, the cam follower assembly is located relative to the gear/cam assembly 74 such that follower wheels 120 and 126 engage the upper and lower smooth surface portions 106 of the cam plates 84, 86 respectively. In other words, during rotation of the gear/cam assembly, as smooth surface portions 106 rotate past the follower assembly 108, the wheels 122, 126 will rotate about their pins 118, but the cam follower assembly 108 and shaft 110 cannot rotate. The engagement of surfaces 106 with the followers is arranged to occur during indexing movement of the turntable.

Now, with further reference to FIG. 4, during a dwell period of the rotatable table 12 (during which gear 58 continues to rotate), the upper follower 126 will be engaged by the entrance ramp 102 of upper plate 84 and, as it rides over the top land 90, the lower follower 122 will ride into the bottom land 95 on the lower plate 86, thereby commencing clockwise rotation of the follower assembly 108 and shaft 110. The remaining follower wheels 128, 124, 130 and 120 engage the remaining top and bottom lands of the cam/gear assembly in a similar manner, causing further rotation of the shaft 110.

The entrance ramp 102 serves to ease the cam follower assembly 108 into rotation with the cam plates 84, 86, increasing the angular velocity of the follower assembly to insure a smooth transition into the alignment operation. Similarly, the exit ramp 104 serves to ease the transition to dwell, decreasing the angular velocity of the follower assembly. It should be noted that the cam plate and follower wheel assembly as well as the gear train including drive gear 58, and gears 62, 64 and 82, have been configured to produce a 360° rotation of shaft 110 during one pass of the six cam lobes of the assembly 74.

With specific reference to FIGS. 1–3a, as the shaft 110 rotates through 360° during one cycle of the cam/gear assembly 74, i.e., from entrance ramp 102 to exit ramp 104), the index arm 140 will orbit the container side wall, also through 360°, and the edge 142 of the arm (see FIG. 3a) will find and engage the longitudinal seam 38 of the container side wall and then rotate the container (supported on ring 50) 14 through whatever portion remains of the 360° cycle of the index arm 140. In other words, the seam 38 ultimately will locate at a predetermined position regardless of when the arm 140 first engages the seam 38. As already noted above, during the orbital movement of the indexing arm 140, the latter is biased radially against the container side wall by means of the torsion spring in the sleeve 136.

After the arm 140 has completed its 360° movement, a dwell period ensues as the followers again ride on smooth surfaces 106 of plates 84, 86 until the next container arrives at the alignment station 48, and the above-described movement is repeated.

It will be appreciated from the above that the diameter of table 12, spacing of the apertures 52, the cam/gear assembly 74, and follower assembly 108 are configured to rotationally align each container, in sequence, during dwell periods of the turntable 12 (after filling of containers at the filling station 18). The overall arrangement may be adjusted to accommodate various turntable and container sizes, filling periods, etc. in accordance with routine engineering practice.

With reference again to FIG. 1, when the filled container 14 is indexed to the lid applying station 20, a lid 40 is applied to the container in the usual manner of the conventional Flex-E-Fill® machine. The lidded container is then indexed to the die press station 22 where the lid 40 is secured to the container as described in greater detail below.

Figure 5:
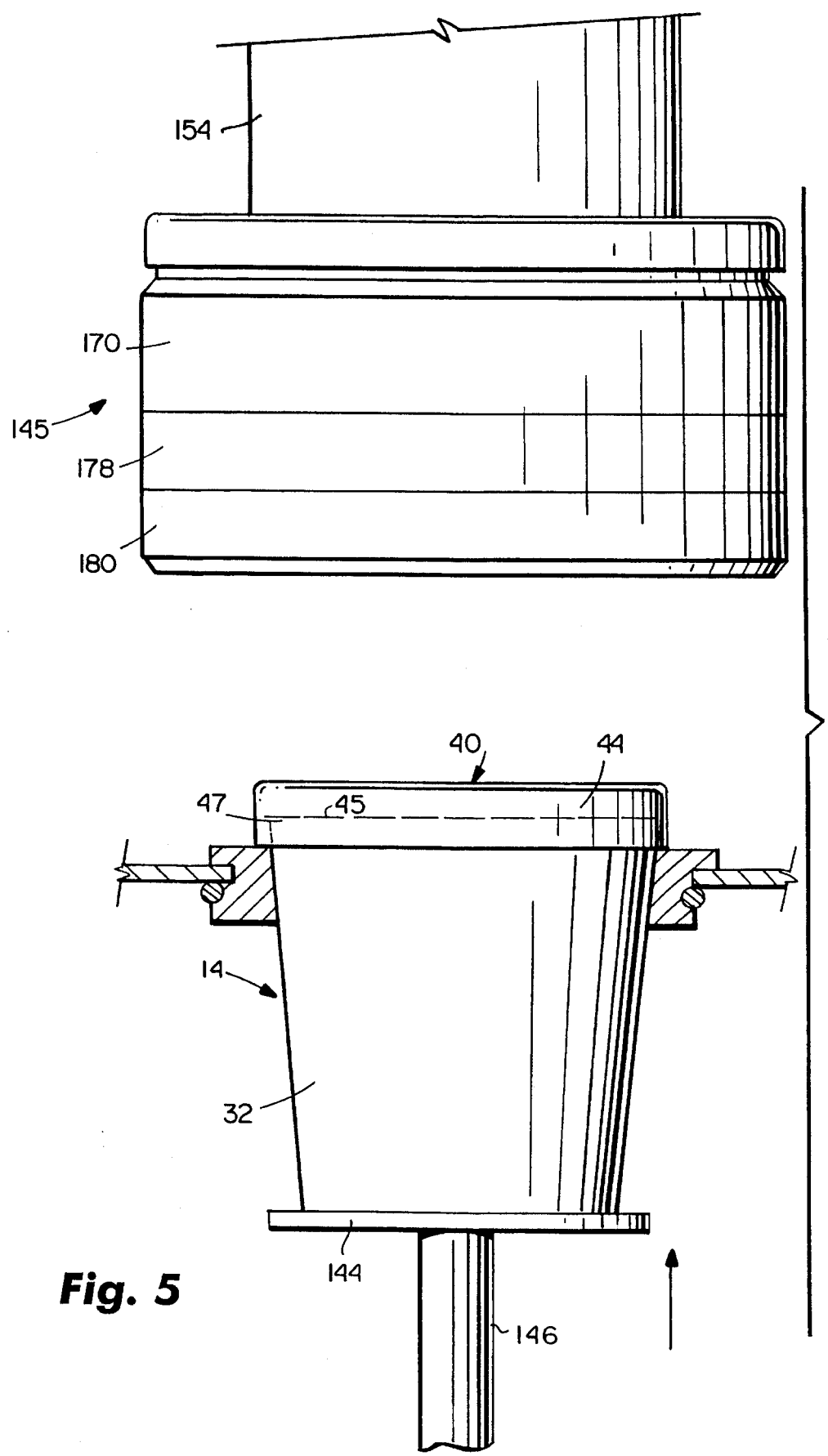
FIG. 5 is a partial side view of a die press head and container of the type incorporated in FIG. 1.

Referring now to FIG. 5, when the lidded container 14 reaches the die press station 22, a support base or disk 144 is raised by a cylinder 146 so as to engage the bottom of the container 14 and to raise the container 14 out of engagement with the support ring 15, upwardly into the die press head 145, described below in connection with FIG. 6.

The die press head 145 includes a cylinder (thru) shaft 148 which is fixed by adapter pin 150 or other suitable means to head mount 152 (FIG. 1) of the assembly 22. The head mount 152 is, of course, fixed relative to the table 12, such that individual containers 14 are indexable to the die press station 22 on the rotatable table 12.

A piston shaft 148 extends from a cylinder 154, and control lines 156, 158 connect the cylinder to a suitable source of fluid (air or liquid) and related controls for moving the cylinder 154 and piston 153 relative to one another.

The piston shaft 148 mounts a piston 160 formed at its lower end with a peripheral lip 162 in which is seated on an insert or disk 164. The latter is secured to the piston by means of screws 166 or other fasteners. The peripheral lip 162 of piston 160 and the peripheral edge of the insert 164 are shaped generally to conform to the roll seam 46 of the lid 40, where skirt 44 and center board or disk 42 are joined. In other words, the peripheral edges of the curling head 160 and insert 164 are designed to mate with the peripheral edge 46 of the container lid 40 when the container is raised into the die press head 145 to the position illustrated in FIG. 6.

The elements described below are secured directly or indirectly to the cylinder 154 for movement relative to the piston 160. An upper annular ring 170, properly aligned via an annular orientation ring 172 and held by an inner shoulder ring 174 are together secured directly to the cylinder 154 by screws 176 or other suitable fasteners. An annular spacer ring 178 and a lowermost tapered ring 180 are secured to the upper ring 170 by screws 182 or other suitable fasteners. The axial dimension of the spacer ring 178 may be varied to suit different size containers. The tapered ring 180 is formed with a downwardly and radially inwardly extending inclined or tapered surface 184 which serves as a camming surface, described in greater detail below.

A pressure disk or ring 186 surrounds the curling head 160, and is provided with a radially inwardly directed flange 188 which is adapted to seat on a horizontal shoulder 190 of the piston 160. The pressure disk 186 is free to move upwardly and downwardly relative to both the piston 160 and cylinder 154, within limits as explained below. The pressure disk 186 is provided with a plurality of upwardly open recesses 192, extending about its periphery, each adapted to receive a coil spring 194. Each spring extends upwardly through a respective bore 196 formed in the upper ring 170 and into engagement with a cap 198 fitted in the bore 196 and adapted to engage the undersurface of the orientation ring 172. In the normal inoperative position illustrated in FIG. 6, the springs 194 are in compression, exerting a downward force on the pressure disk 186, but the latter is sandwiched between the piston 160 and the shoulder ring 174.

Beneath the pressure disk 186, and extending downwardly to the tapered surface 184 of the lower ring 180, there are a plurality of curved curling die segments 200 (four in the exemplary embodiment, each extending through approximately 90°) which, when closed (as described below) form an annulus. Each segment includes an upper flat surface 202 which engages the underside of the pressure disk 186, and a generally vertically extending wall 204 terminating at a lower end which includes an interior, upwardly opening curling surface (having a substantially "U" or "trough" shape) 206, and an exterior downwardly and inwardly extending surface 208 which mates with the tapered surface 184 of the lower ring 180. The segments 200 are held in circumferentially spaced relationship to each other in the inoperative position (illustrated in FIG. 6) by a plurality of coil springs 210, represented schematically in FIG. 7. These springs 210 are seated in recesses 212 formed in adjacent surfaces of adjacent segments. At the same time, the segments 200 are prevented from relative rotation about the vertical center axis of the die head 145 by radially extending abutments 214 formed in the ring 180. Thus, as shown in FIGS. 6 and 7, it will be understood that there is ample room for a container 14 to be lifted upwardly on the support 144 and into the die press head 145 until the container lid 40 engages the piston insert 164, without interference from the curling die segments 200.

Figure 6:
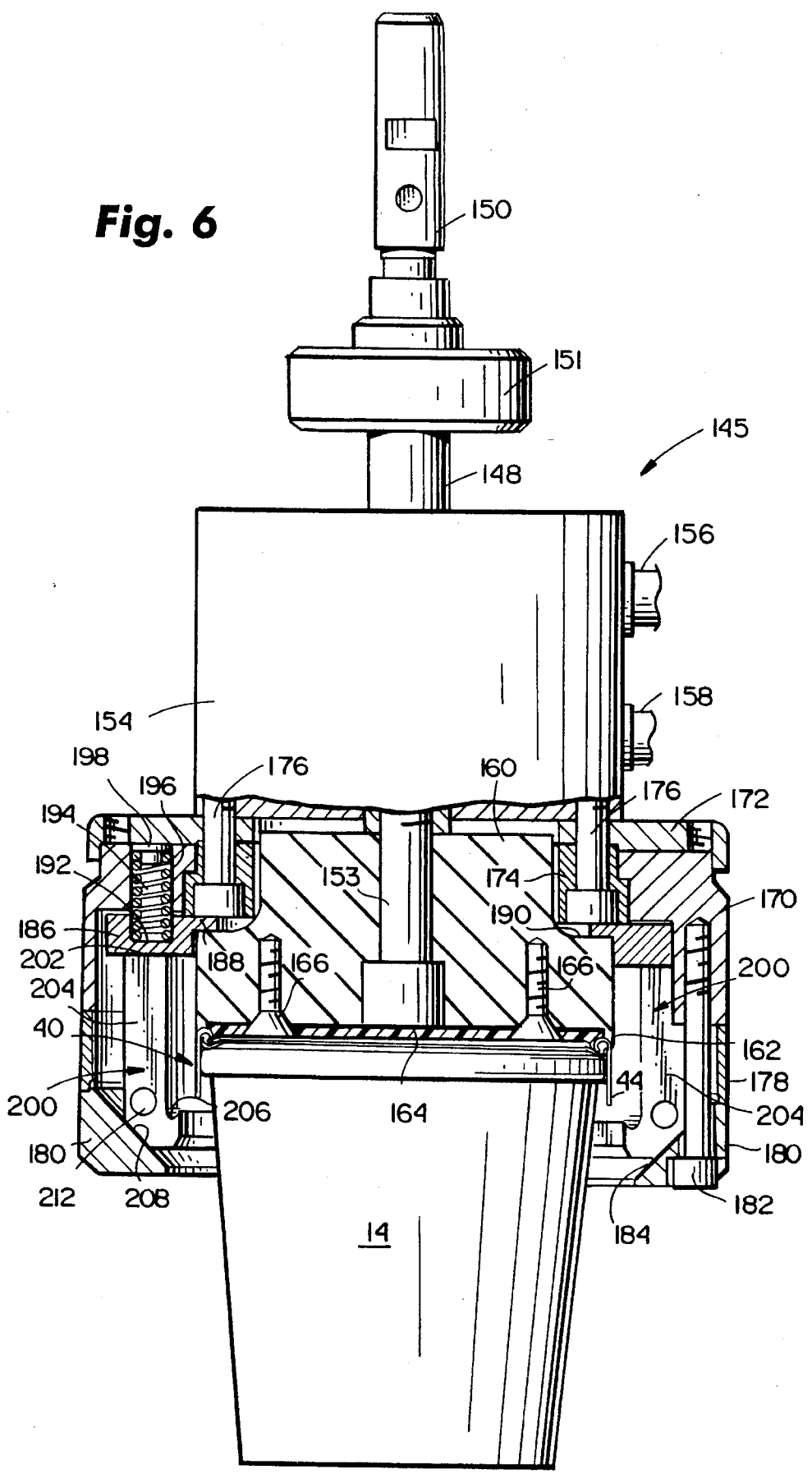
FIG. 6 is a partial side section view similar to FIG. 5, but illustrating the container in position within the die press head.
Figure 7:
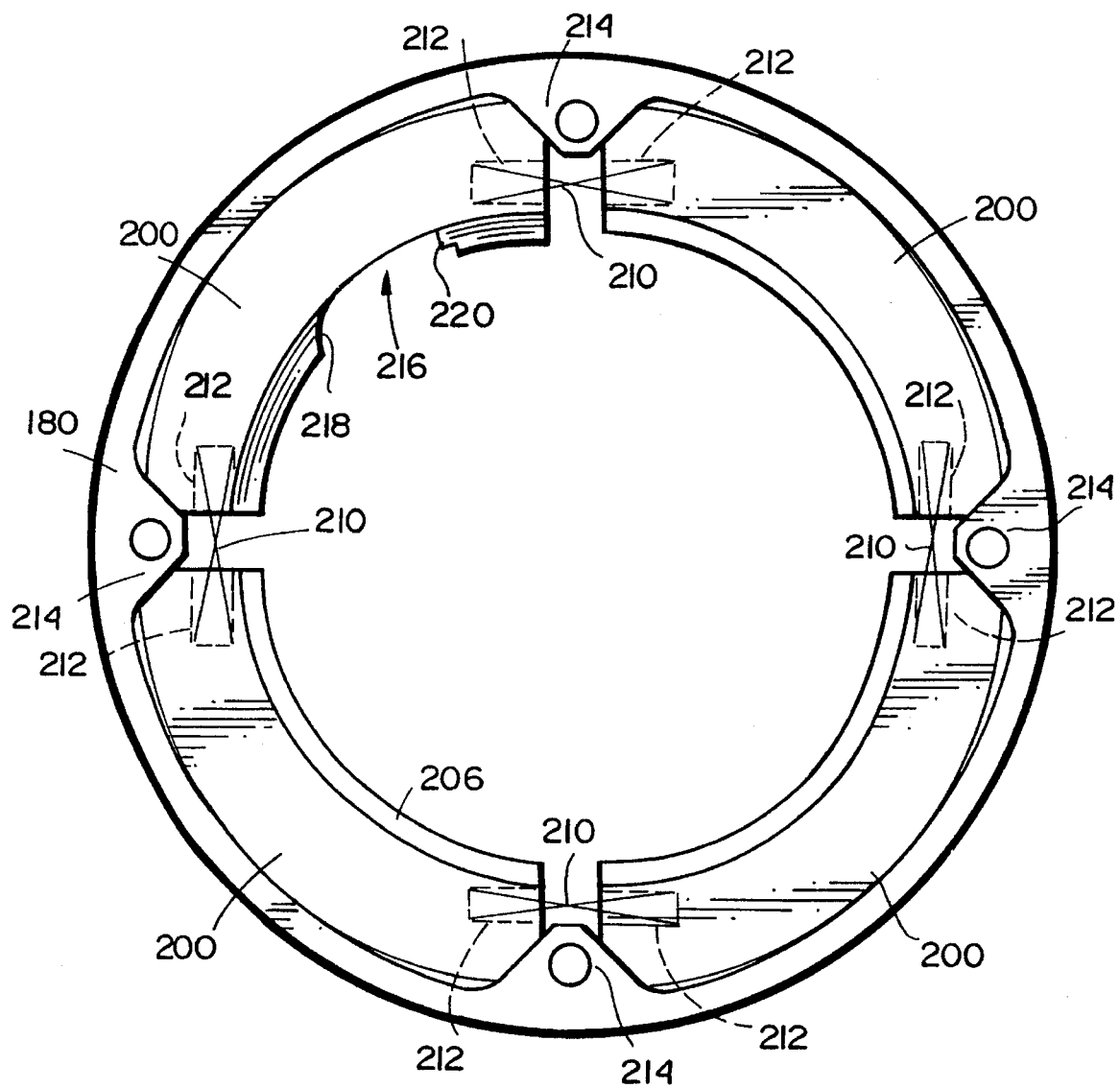
FIG. 7 is a plan view of the segmented dies illustrated in the die press head of FIG. 6.
Figure 8:
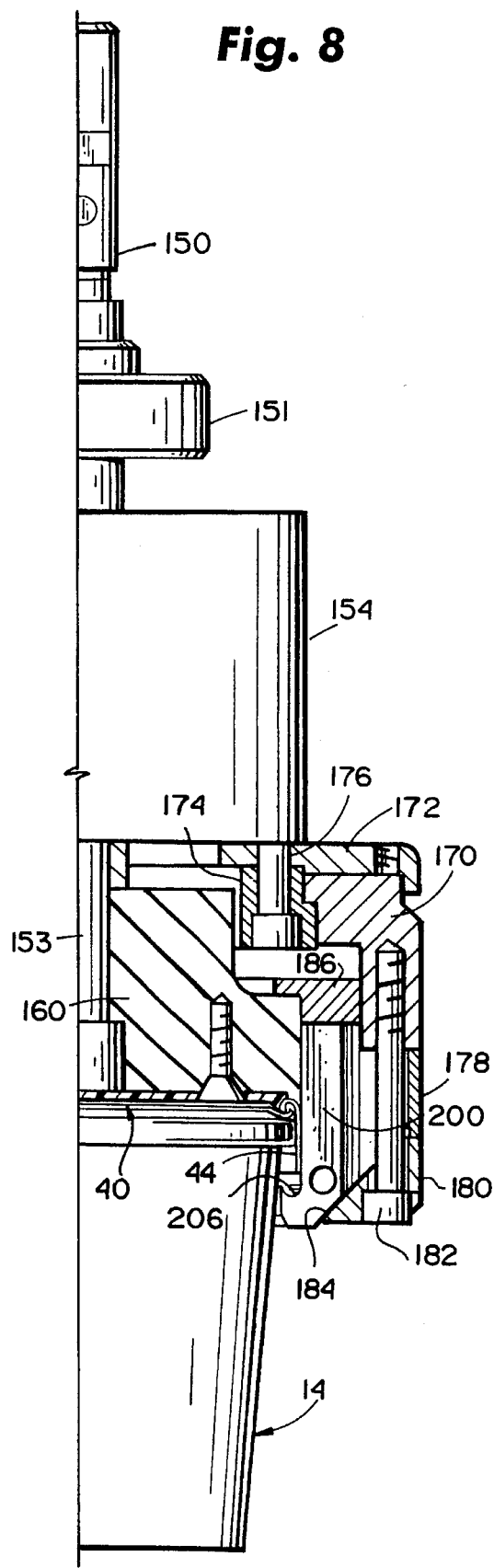
FIG. 8 is a partial section similar to FIG. 6, but with the die segments moved to a closed position.
Figure 11:
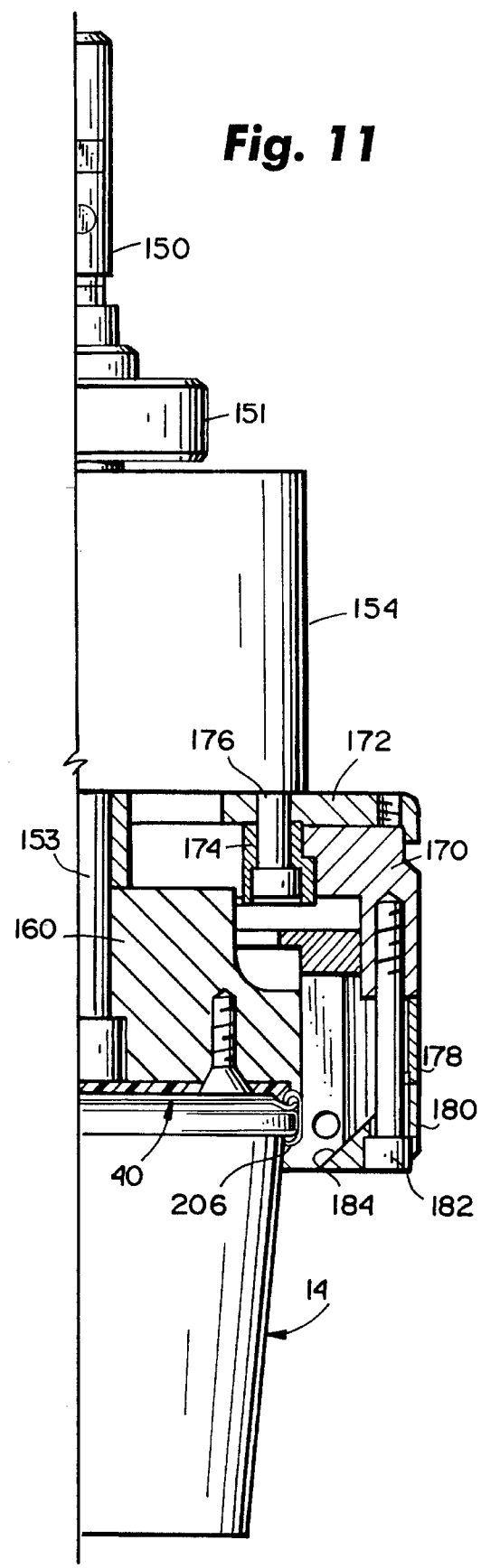
FIG. 11 is a partial section similar to that shown in FIG. 8, but with the die segments drawn up into a lid curling position.
Figure 9:
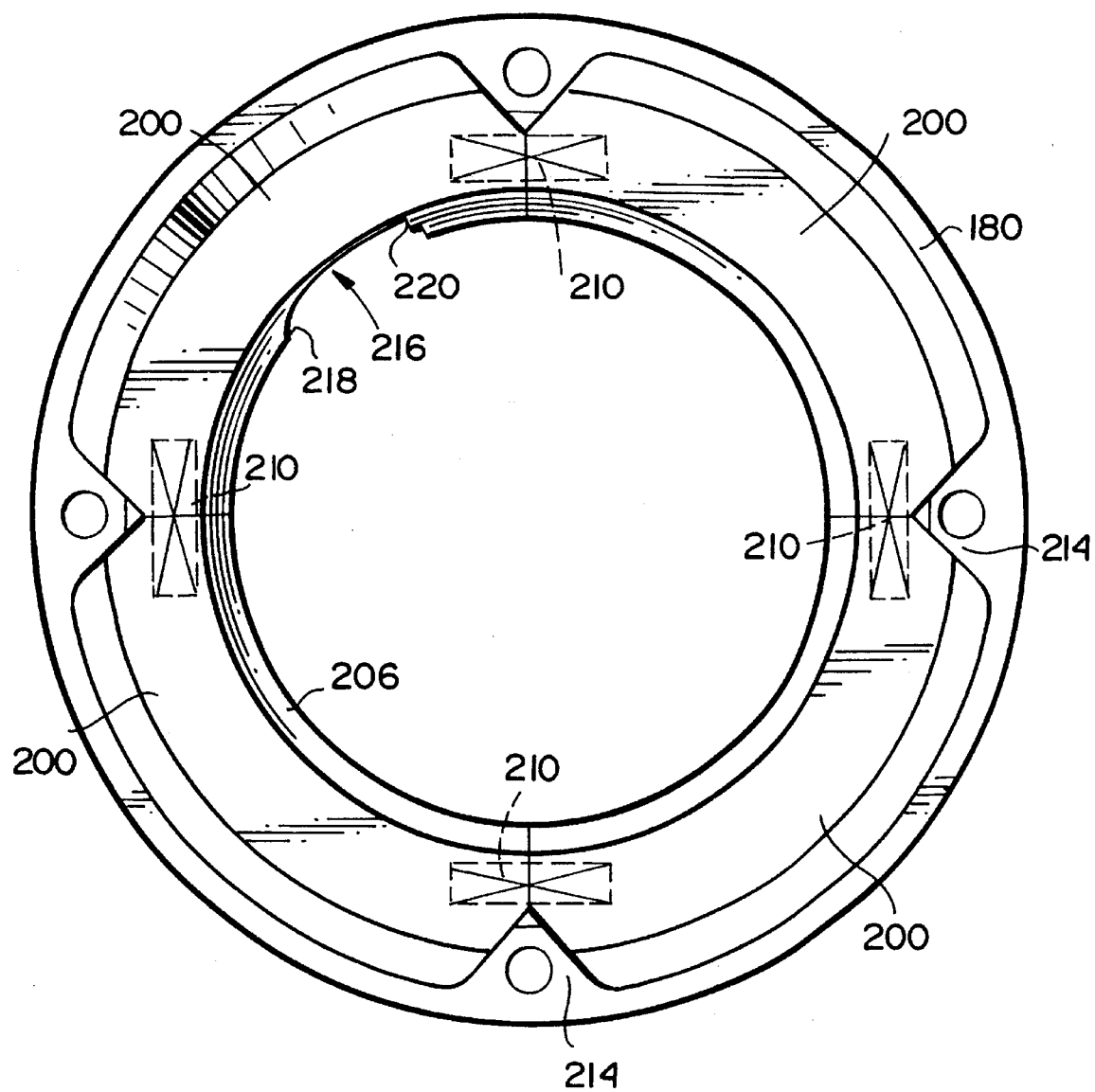
FIG. 9 is a plan view of the die segments in the closed position.
Figure 10:
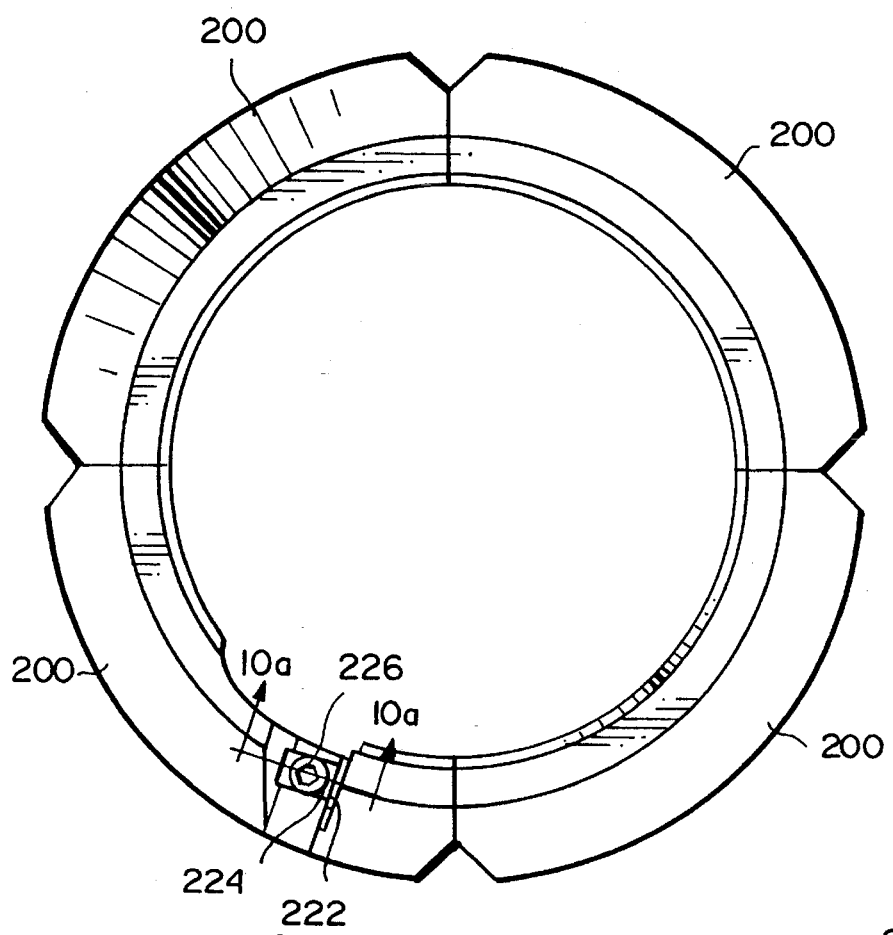
FIG. 10 is an underside view of the segments illustrated in FIG. 9.
Figure 10A:
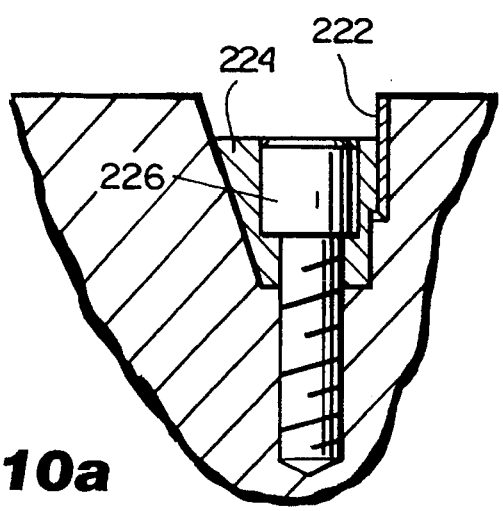
FIG. 10A is an enlarged detail taken along the line 10A—10A of FIG. 10.

The segments 200 are movable radially from the circumferentially spaced relationship shown in FIGS. 6 and 7 to the circumferentially closed relationship shown in FIGS. 8 and 9. In the closed position, the upwardly open curling surface 206 extends substantially continuously in a 360° C. circle, with the exception of an area 216 where surface 206 is omitted. This interruption in the curling surface 206 forms the tab T, best seen in FIGS. 20 and 21. Area 216 is defined at one end by a smooth transition surface 218 and at its opposite end by an abrupt knife edge seating surface 220. With specific reference now to FIGS. 10 and 10a, a knife element 222 is clamped against the surface 220 by a wedge element 224 which may be secured to the segment by a screw 226. As shown in FIGS. 12a through 12e, the knife element 222 has a cutting edge 228 which extends partially across the "trough" defined by curling surface 206. This cutting edge 228 forms the vertical slit in the skirt 44 which forms edge 230 of the gripping tab T. The depth of slit 230 is adjusted to terminate at or adjacent the peripheral line of perforations 45 formed in the skirt 44. The manner in which the tab is manipulated to enable removal of lid 40 is described further below.

It should be noted here that the matching of the tab location to a specific marker in the cup imprint is a simple matter. The cap orientation mechanism described above places the cup seam in a fixed, non-adjustable position. The curling head die segments can then be rotated (through a full 360° if necessary) about the axis of the cup in order to locate the tab forming segment in a location matching the consistently oriented marker on the cup imprint.

The operation of the die press head 144 will now be described with reference to FIGS. 6–12e. As already indicated, FIG. 6 shows the die press head 145 in an "open" position with the container/lid assembly ready for curling. As the cylinder 154 is drawn upwardly, relative to the stationary piston 160, the horizontal separating forces of springs 210 are overcome as the tapered surface 184 of lower ring 180 moves upwardly, causing segments 200 to cam inwardly into engagement with each other. This movement also releases the vertically oriented springs 194 to push downwardly on the pressure disk 186 (and segments 200), so as to hold the disk 186, and segments 200 at the same height, while cylinder 54 rises along with upper ring 170, spacer ring 178 and lower ring 180. This relative movement causes vertical separation between the disk 186 and the upper ring 170 as shown in FIG. 8. In the position shown in the latter Figure, the die segments 200 are now closed (the position also shown in FIG. 9), but, again, the segments remain vertically spaced from the lid skirt 44 to the same extent as shown in FIG. 6 when the dies are in the open position.

Upon closure of die segments 200, further upward movement of the cylinder 154 draws the entire cylinder assembly including the segments 200 upwardly as shown in the sequence illustrated by FIGS. 12a to 12e. During this further upward movement, curling surface 206 engages the lid skirt 44 to curl the latter inwardly and upwardly beneath the container rim 34 to the position illustrated in FIG. 12e and FIG. 22. That portion of the skirt which lies within area 216 remains untucked or uncurled. At the same time, knife edge 228 slices through the skirt 44 at one end of the uncurled area 216 to form the edge 230 of the grip tab T. The upward movement of the cylinder, and thus the degree of curling of the lid skirt 44, is controlled by a suitably adjusted stop 151 on shaft 148.

For other size containers, the relationship between the bottom of the cup rim or curl and the line of perforations on the lid skirt remains essentially unchanged, even though the actual cup curl height will vary with cup size.

Upon completion of the curling operation, the die head movement is reversed to initially lower the closed die segments and to then permit horizontal springs 210 to separate the segments 200 so as to again assume the position shown in FIG. 6. The support 144 is lowered to drop the container 14 back into the index table 12. The die press head remains in this inoperative position until the next successive container and lid assembly is indexed to the die press station 22, and the sequence is then repeated.

Figure 13:
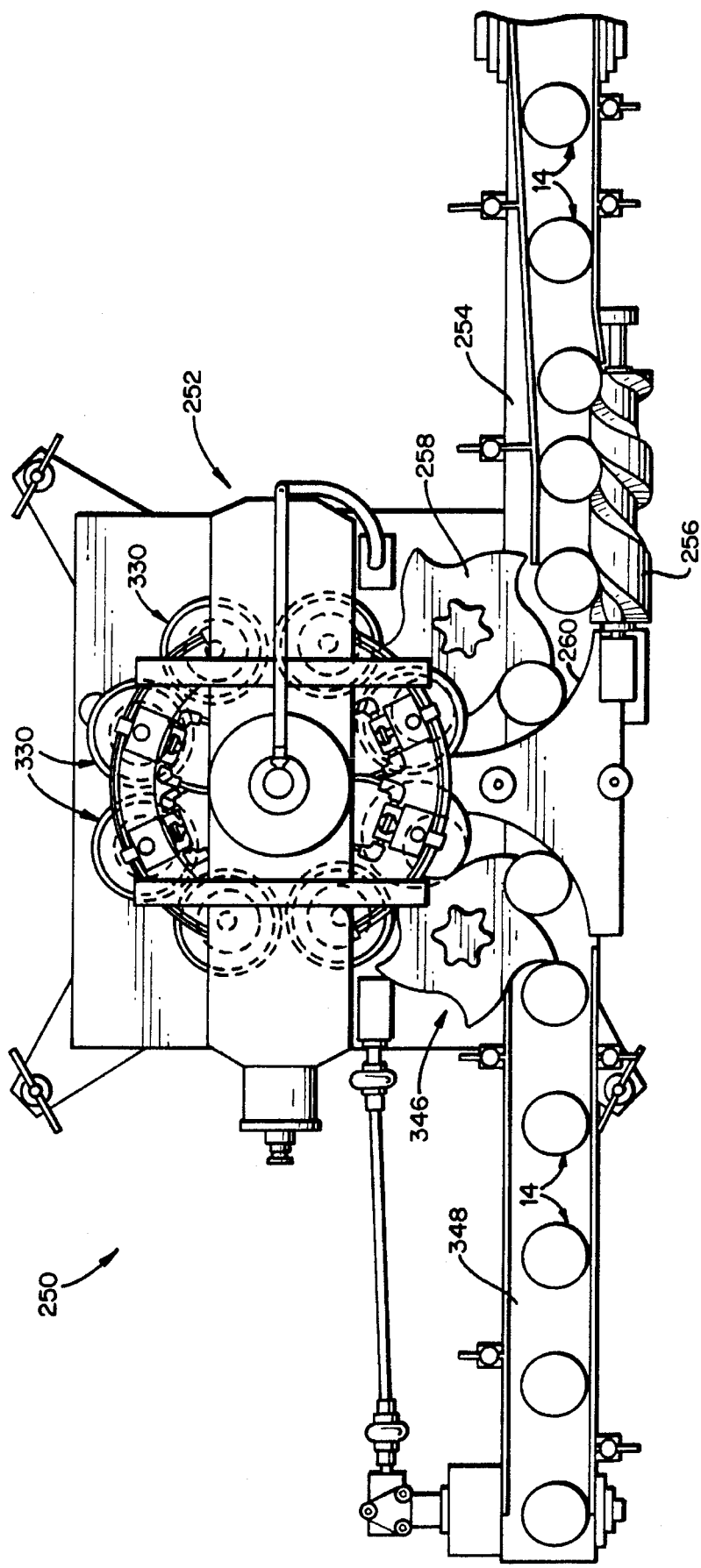
FIG. 13 is a plan view of another apparatus incorporating the subject invention.
Figure 14:
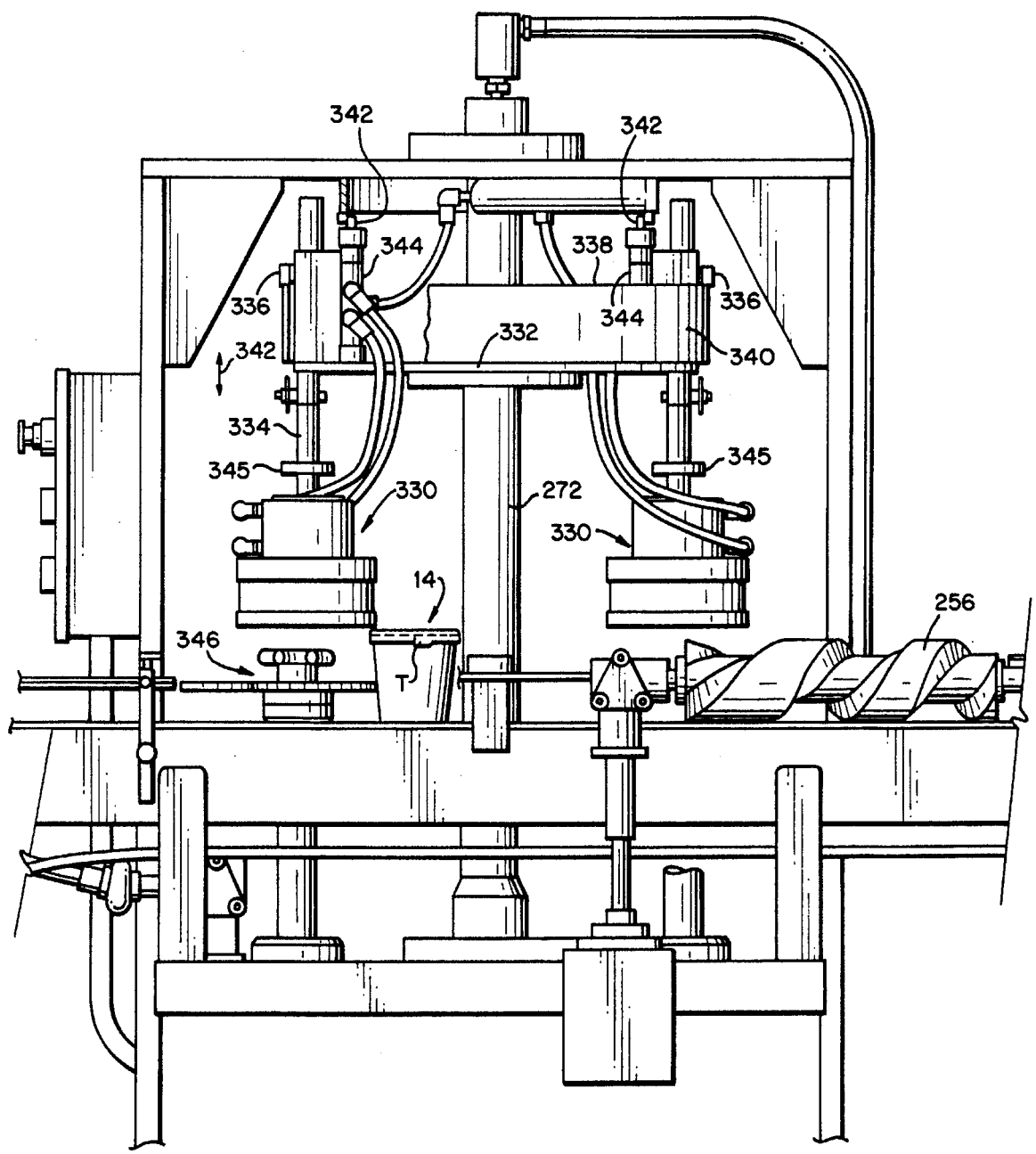
FIG. 14 is a partial side view of the apparatus illustrated in FIG. 13.
Figure 15:
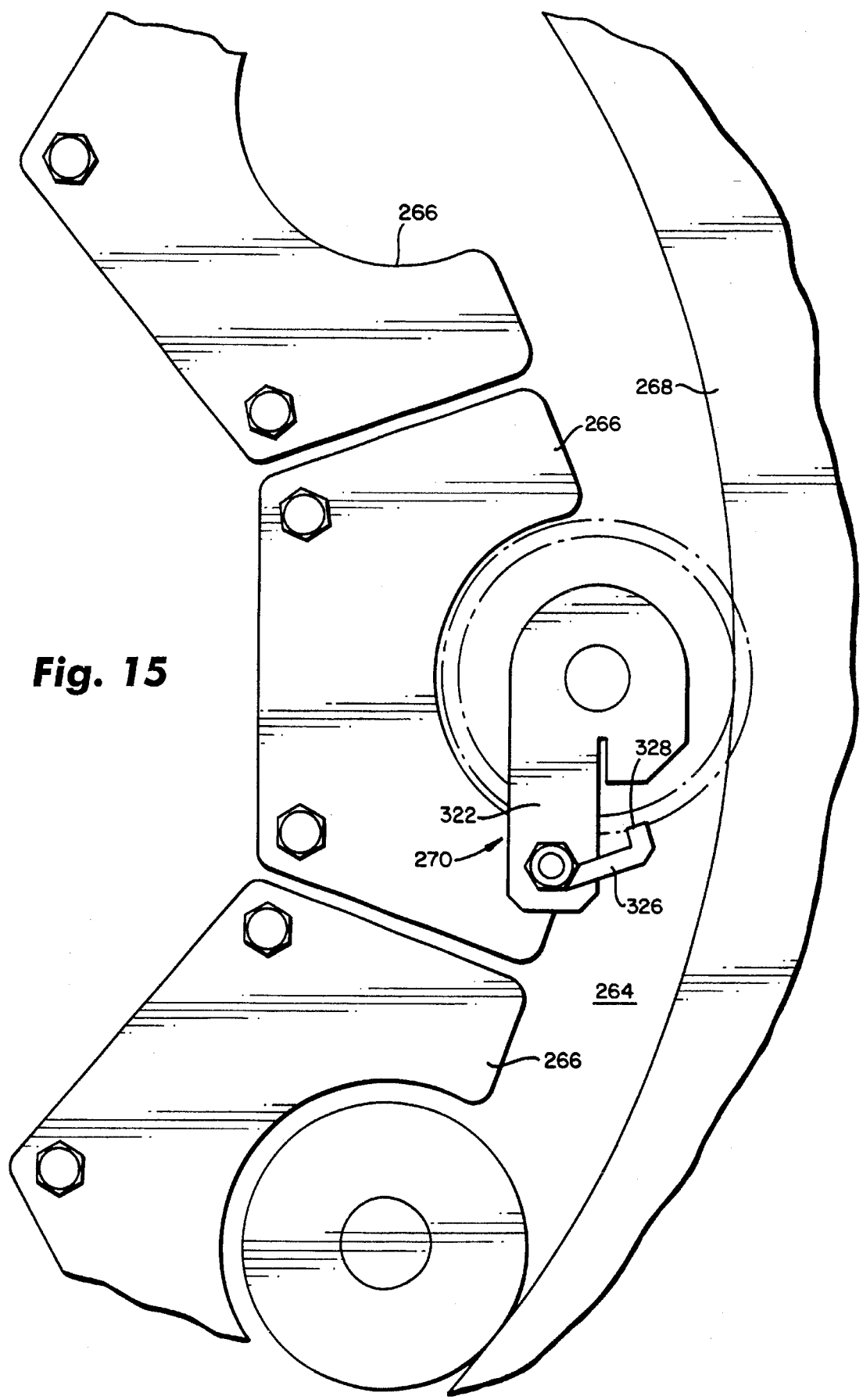
FIG. 15 is a partial plan view of a turntable and alignment mechanism of the type incorporated in FIG. 13.

Turning now to FIGS. 13 and 14, another apparatus 250 is disclosed which enables substantially continuous press curling of container lids 40 on containers 14. In this second exemplary embodiment, the containers 14 are already filled and lidded as they approach the continuous die curling station 252 by means of conveyor 254. An auger or worm 256 serves to provide proper linear spacing between successive containers so as to enable a conventional star wheel feeder 258, in cooperation with guide surface 260, to introduce the containers onto individual pedestals (one shown at 262 in FIG. 17) fixed in an annular array on a rotatable table 264. The table 264 is provided with individual container holders 266 (see FIG. 15) which engage a portion of a respective container side wall, as well as a radially outer continuous guide surface 268 which cooperate with holders 266 to hold the containers 14 in the required spaced relationship. The containers are able, however, to be rotated about their own axes as described below.

Each pedestal 262 is provided with its own alignment mechanism 270, each of which is generally similar to the alignment mechanism 48 described above in conjunction with the first described embodiment. The principal difference is in the drive mechanism as dictated by the multi die press head table.

Figure 16:
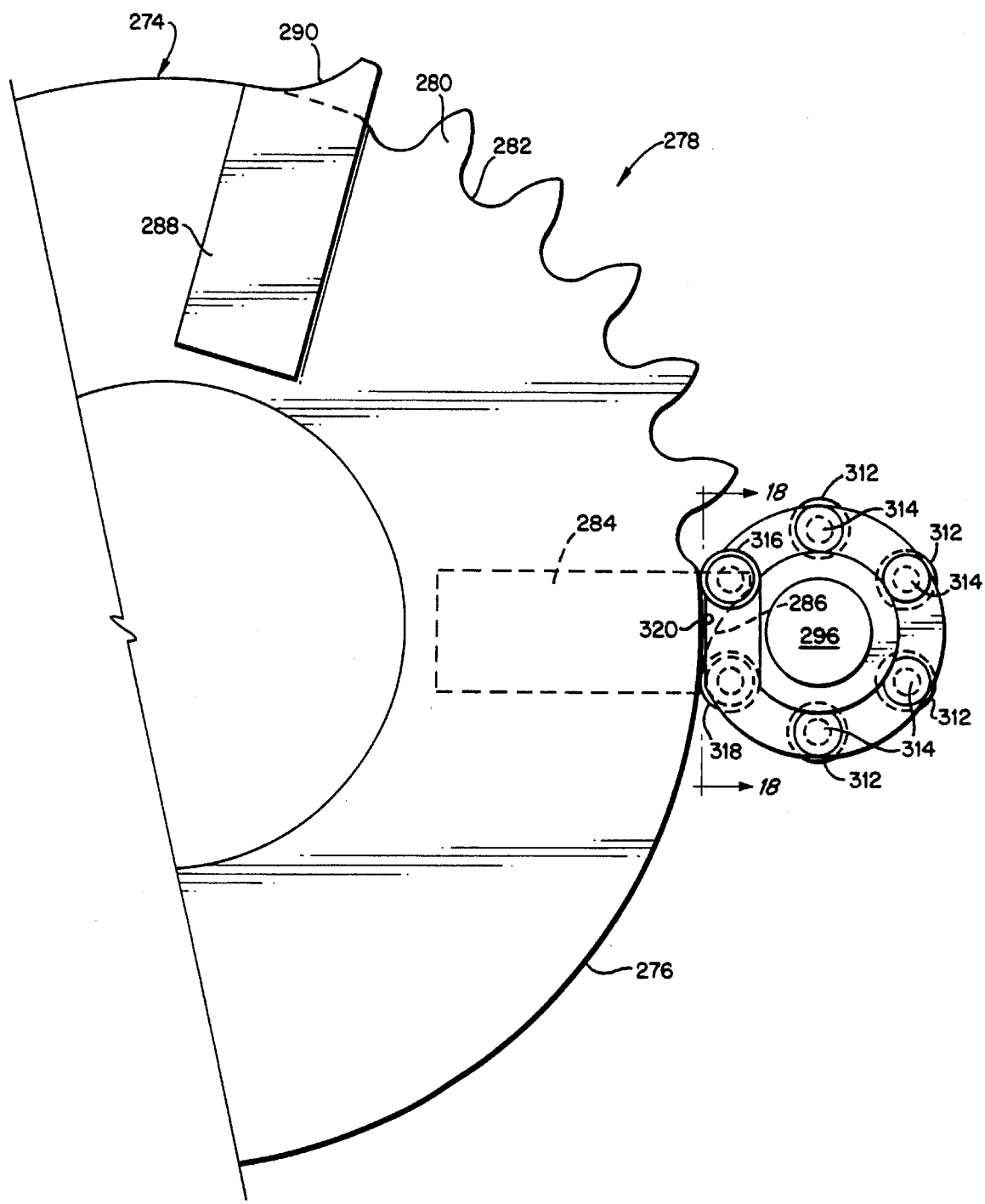
FIG. 16 is an enlarged partial plan of the turntable drive and alignment mechanism incorporated into the apparatus of FIG. 13.

With specific reference to FIG. 16, a fixed annular plate 274 is located beneath the support table 264, concentric with the axis of a central shaft 272. Thus, the table 264 rotates by means of a suitable drive arrangement relative to the fixed plate 276.

The plate 274 is formed with a smooth peripheral edge surface 276 which extends approximately 240° about the periphery of the plate. The remaining approximately 120° of the plate is provided with a plurality of gear teeth 280, the pitch of which is determined by bottom lands or root portions 282. As viewed in FIG. 16, a plate or tab 288 is welded or otherwise secured to the upper surface of the plate 274 and is formed with a curved ramp surface 290 which merges with the peripheral edge surface 276. A similar, mirror image plate or tab 284 is fixed to the lower surface of the plate 274 and is formed with a similarly curved ramp surface 286. It will be appreciated that surfaces 286 and 290 extend in opposite directions and provide transition surfaces having functions similar to ramp surfaces 102, 104 described above.

Returning to FIG. 17, the alignment mechanism 270 includes housing 292 secured to the underside of the rotatable table 264 by means of bolts 294. Fixed within the housing is a shaft 296, secured to the lower housing wall by means of a bolt 298. The shaft extends upwardly through the housing and through an aperture 300 in the table 264 and supports the pedestal 262 by means of a bolt or screw 302. Sleeve bearings 304, 306 are provided at lower and upper ends respectively of the shaft and these bearings in turn mount a sleeve 306. The sleeve 306 is rotatable about the shaft 296.

Figure 18:
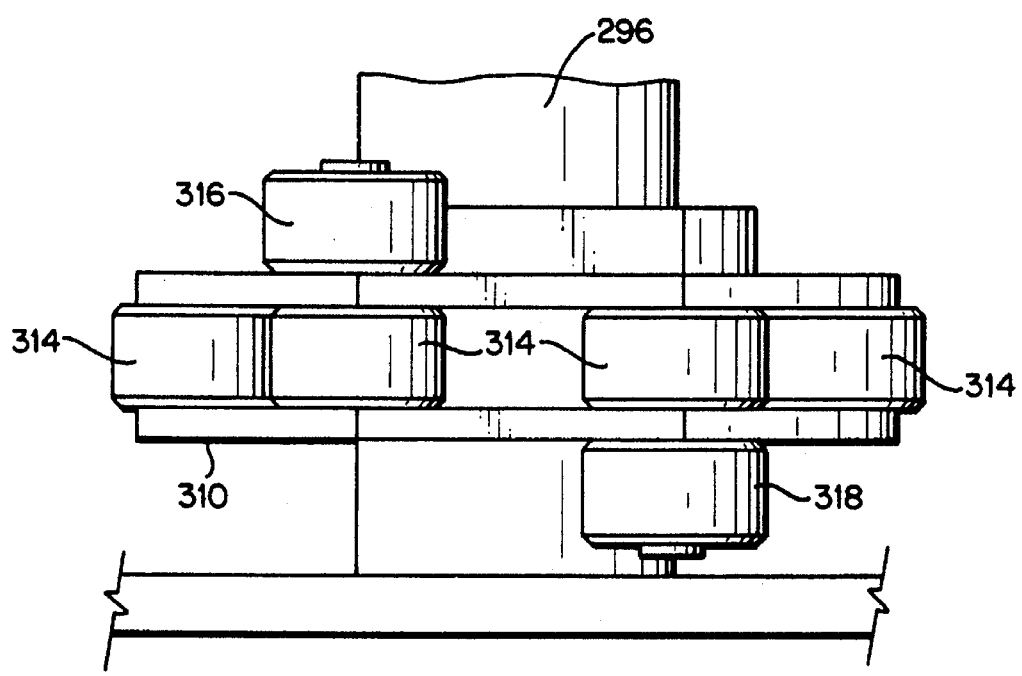
FIG. 18 is an enlarged partial side view of cam followers of the type shown in FIG. 17.

The rotatable sleeve 306 has a follower assembly 308 fixed to its lower end for rotation with the sleeve 306. The follower assembly 308 comprises a roller cage 310 which mounts six follower wheels 312 for rotation about pins 314. An additional follower wheel 316 is mounted above the cage 310 for rotation about one of the pins 314 and another follower wheel 318 is located below the cage 310 also for rotation about a pin 314, as best seen in FIG. 18. Returning to FIG. 16, it will be seen that the upper follower wheel 316 is mounted concentrically with one of the intermediate follower wheels 314 while the lower follower wheel 318 is mounted concentrically with an adjacent intermediate follower wheel 314.

As shown in FIG. 16, the lower follower wheel 318 is about to traverse the transition surface 286 of tab 284. During rotation of the table 264 prior to the rotational alignment operation, it will be appreciated that the intermediate follower wheels 312 below the upper follower wheel 316 and above the lower follower wheel 318, respectively, rotate about their own axes as the follower assembly 308 orbits the fixed plate 276. During this time, flat surface 320 prevents rotation of the follower assembly 308 as a whole, i.e., rotation of the follower assembly and sleeve 306 about the shaft 296. The manner in which the follower assembly interacts with the geared or toothed area 278 will be described further herein.

Returning to FIG. 17, a crank arm 322 is fixed to the rotatable sleeve 306 and a shaft 324 extends upwardly from that end of the crank arm which is remote from the shaft 296. The shaft 324 supports an index arm 326 which is biased by a torque spring in much the same manner as the index arm 140 in the first described embodiment. The index arm 326 has a vertical edge 328 which engages the container seam 38, again in the same manner as edge 142 on the index arm 140.

Returning to FIG. 16, as the container 14, supported on pedestal 262, rotates with table 264 and alignment mechanism 270, i.e., as the follower assembly 308 orbits the fixed plate 276, the lower follower wheel 318 will engage the transition surface 286 and, as it does so, the intermediate follower wheel 312 located directly below the upper follower wheel 316, will move down into the bottom land 282 of the first gear tooth 280. This compound motion will cause the follower assembly 308 to rotate about its own axis, i.e., about shaft 296 as successive followers 312 engage successive teeth 280. At the same time, the crank arm 324 and the index arm 326 orbit the container 14 as in the previously described embodiment. The edge 328 of the index arm will locate the seam 38 and rotate the container through the remaining portion of the 360° cycle of the index arm to bring the seam to a predetermined location. At the end of the 360° cycle of rotation of assembly 308 (which is arranged to occur as the assembly moves through the orientation segment on the fixed plate 276), the upper follower wheel 316 will engage the transition surface 290 which causes the rotational speed of the follower assembly to decrease until the follower assembly is once again located adjacent the smooth peripheral surface 276 (and precluded from further rotation about its own axis) as the table 264 continues to rotate relative to the fixed plate 276. Soon after, the next container 14, on an adjacent supporting pedestal 262, will arrive at the geared area 278 of the plate 276 and the alignment operation will be repeated for that next successive container.

With regard now to FIG. 14, shortly after the alignment operation is completed, the curling of the lid skirt into secure engagement with the container takes place as the table 264 continues to rotate. In this second embodiment, the container remains at a stationary level on the pedestal 162, and the individual die press heads are lowered over the container.

Figure 19:
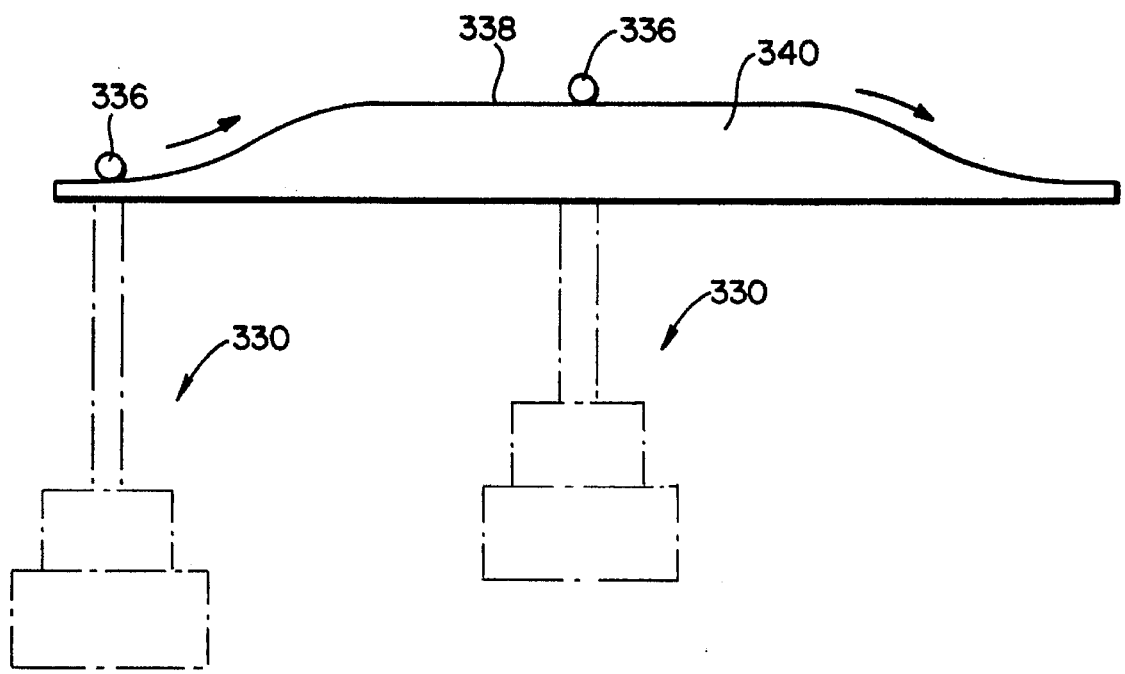
FIG. 19 is a schematic representation of the manner in which the die press heads are reciprocated in the apparatus shown in FIG. 13.

More specifically, and with general reference to FIGS. 14 and 19, the individual die press head assemblies 330 are moved between inoperative and operative positions by reason of a stationary annular cam which surrounds a die press head supporting plate 332 which, in turn, is secured to the shaft 272 for rotation with table 264. The individual die press head assemblies 330 are mounted on the supporting plate 332 for reciprocating up and down movement, i.e., the die press head assemblies 330 include shafts 334 which are mounted for sliding movement in an up and down direction as indicated by arrow 342. Each shaft 334 has a cam follower or roller 336 which rolls along the upper edge 338 of the annular cam 340. With specific reference to FIG. 19, a schematic diagram illustrates a cam plate 340 in linear form for the sake of convenience. It may be seen that as follower 336 moves along the cam edge 338, the contoured surfaces of the latter will cause the die press head 330 to move upwardly or downwardly depending on the location of the follower 336. The contoured surfaces have been located and configured to coordinate the movement of each die press head 330 with the completion of a container rotational alignment operation. Thus, shortly after an alignment operation has been completed, and as the table 264 continues to rotate, the die press head 330 will move downwardly over the top of the lidded container 14 to a position which is essentially identical to the relative position indicated in FIG. 6. When the die press head 330 is properly oriented over the container, a trip switch 342 will cause actuation of a cylinder assembly 344 which will cause retraction of the cylinder 154 (limited by stop 345) relative to the piston 160, thereby pulling the curling die segments 200 upwardly to curl the depending skirt portion 44 of the lid 40 in the same manner as previously described with respect to the first embodiment. Upon completion of the lid securing or locking operation, the cylinder 154 will be extended to release the die segments 200 and the cam follower 336 will ride into the higher portion of the cam plate 340 thereby causing the die press head 330 to be raised to the inoperative position.

Thereafter, the completed container assembly is passed by means of star wheel 346 onto the outlet conveyor 348. It will be appreciated that the continuous nature of the apparatus illustrated in FIGS. 13–19 permits a far greater number of containers to have their associated lids locked into place for any given period of time, than in the first described embodiment.

Generally, and with further reference to FIG. 13, as the containers 14 are moved onto the table 264, the alignment mechanism 270 is activated by the drive almost immediately. Once the rotational alignment has been completed, the die press head is lowered onto container 14, and is activated to complete the curling operation by the time the container reaches the 10 o'clock position. Prior to engagement of the container with the star wheel 346, the die press head is lifted to clear the container 14 by cam plate 340.

From the above, it will be appreciated that the die press heads 145 and 330 are essentially identical and are, in fact, interchangeable between the machines of the first and second embodiments. The segmented die press heads as described have solved a long-standing problem of inability to put a straight wall container into a close tolerance one-piece curling die. It also allows the curling die to have a significantly tighter fit to the lid skirt, thus providing critical support while the skirt is being reformed.

Another major problem overcome by the die press head of this invention is the containment of forces, i.e., all the forces (400 lb. ft. and up) required for the reformation of the lid skirt, are contained in the head itself, thus reducing the wear/size/complexity of the remainder of the equipment.

Another advantage is that by having the open die come down over the container and then close radially on the container, a self-centering feature is added so that the overall process is not sensitive to exact container location nor is it sensitive to somewhat crooked lids or out of round containers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for securing a tamper evident lid to a container wherein the lid includes a depending skin portion and the container includes a rim at an upper open end thereof, the apparatus comprising:

a) first means for pressing a lower portion of the depending skin portion of the lid under and into engagement with the rim of the container to form a curl about a major peripheral portion of the lid while leaving a minor peripheral portion uncurled; and b) second means cooperating with said first means for simultaneously forming a vertical slit in said lower portion of said depending skin portion at an interface between the curled and uncurled portions to thereby simultaneously form a grip tab therein.

2. Apparatus of claim 1 wherein said first means includes an annular die formed as a plurality of die segments, said segments when in a closed position having a substantially continuous upwardly facing curling surface formed therein, said curling surface interrupted over a minor circumferential portion corresponding to the uncurled portion of the skirt.

3. Apparatus of claim 1 wherein said first means comprises a plurality of die segments radially movable between open and closed positions, said die segments forming a closed annulus in the closed position; each of said die segments including a curling surface and one of said segments also including an interrupted area where said curling surface is omitted; and wherein means are provided for locating said curling surfaces below said depending skirt and for moving said die segments upwardly in said closed position to curl said depending skirt under said rim except that said depending skirt portion remains uncurled in said interrupted area.

4. Apparatus of claim 3 wherein said second means includes a knife edge fixed to said one of said die segments at an interface between said curling surface and said interrupted area.

5. Apparatus of claim 1 wherein third means are provided for orienting the container to a predetermined rotational position relative to said first means before said first means engages the container lid.

6. Apparatus of claim 1 wherein said first means includes a single die press at a station fixed relative to a rotatable turntable which indexes containers and lids to said single die press.

7. Apparatus of claim 6 wherein third means are provided for orienting the container to a predetermined rotational position relative to said first means before said first means engages file container lid.

8. Apparatus of claim 7 wherein said third means comprises an alignment mechanism including an arm which locates a longitudinal seam in a side wall of the container and rotates the seam to the predetermined rotational position.

9. Apparatus of claim 1 wherein said first means includes a rotatable table having a plurality of die press heads thereon.

10. Apparatus of claim 9 wherein third means are provided for orienting the container to a predetermined rotational position relative to said first means before said first means engages the container lid.

11. Apparatus of claim 10 wherein said third means comprises an alignment mechanism including an arm which locates a longitudinal seam in a side wall of the container and rotates the seam to the predetermined rotational position.

12. Apparatus for securing a tamper evident lid to a container wherein the lid includes a depending skirt portion and the container includes a rim at an upper open end thereof, the apparatus comprising:

a) first means for pressing a lower portion of the depending skirt portion of the lid under and into engagement with the rim of the container to form a curl about a major peripheral portion of the lid while leaving a minor peripheral portion uncurled; and b) second means cooperating with said first means for simultaneously forming a vertical slit in said lower portion of said depending skirt portion at an interface between the curled and uncurled portions to thereby simultaneously form a grip tab therein;

wherein third means are provided for orienting the container to a predetermined rotational position relative to said first means before said first means engages the container lid; and wherein said third means comprises an alignment mechanism including an arm which locates a longitudinal seam in a side wall of the container and rotates the seam to the predetermined rotational position.

* * * * *